United States Patent
Daum et al.

(10) Patent No.: US 6,826,267 B2
(45) Date of Patent: Nov. 30, 2004

(54) INTERNET ENABLED APPLIANCE COMMAND STRUCTURE

(75) Inventors: Wolfgang Daum, Erie, PA (US); John Steven Holmes, Sellersburg, IN (US); William Hull Bicknell, Louisville, KY (US); Scott Alan Horning, Louisville, KY (US); Tanveer Iqbal, Louisville, KY (US); John Kenneth Hooker, Louisville, KY (US); Robert Marten Bultman, Smithfield, KY (US); Ziqiang Hu, Prospect, KY (US); Scott Charles Evans, Burnt Hills, NY (US); John Erik Hershey, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 303 days.

(21) Appl. No.: 09/903,903

(22) Filed: Jul. 12, 2001

(65) Prior Publication Data

US 2003/0109938 A1 Jun. 12, 2003

Related U.S. Application Data

(60) Provisional application No. 60/219,086, filed on Jul. 18, 2000.

(51) Int. Cl.[7] .............................................. H04M 11/00
(52) U.S. Cl. ............................ 379/102.03; 379/102.01; 340/825
(58) Field of Search ....................... 379/102.01–102.03, 379/102.07, 106.01, 93.05–93.08; 340/825, 5.8; 700/65; 709/223, 224, 200, 206

(56) References Cited

U.S. PATENT DOCUMENTS

| | | | |
|---|---|---|---|
| 5,898,831 A | 4/1999 | Hall et al. | |
| 5,909,183 A | 6/1999 | Borgstahl et al. | |
| 6,041,346 A | 3/2000 | Chen et al. | |
| 6,121,593 A | 9/2000 | Mansbery et al. | |
| 6,229,433 B1 | 5/2001 | Rye et al. | |
| 6,243,772 B1 | 6/2001 | Ghori et al. | |
| 6,665,384 B2 * | 12/2003 | Daum et al. | 379/102.03 |
| 6,690,979 B1 * | 2/2004 | Smith | 700/65 |
| 6,693,999 B2 * | 2/2004 | Ito et al. | 379/102.03 |
| 2003/0001721 A1 * | 1/2003 | Daum et al. | 340/5.8 |

* cited by examiner

*Primary Examiner*—Wing Chan
(74) *Attorney, Agent, or Firm*—H. Neil Houser, Esq.; Armstrong Teasdale LLP

(57) ABSTRACT

Appliances (102, 102, 106 and 108) are controlled by providing a source (2016, 112) of command fields (CMD, FIG. 2) that include a context subfield (Community, FIG. 4) defining operating modes and a command subfield (Command, FIG. 4) defining operations to be performed within the context subfield. A network (119) transmits the command fields between the source and the appliance. A controller (112, 116) processes the command fields so that an operation defined by one of the command subfields is performed.

32 Claims, 21 Drawing Sheets

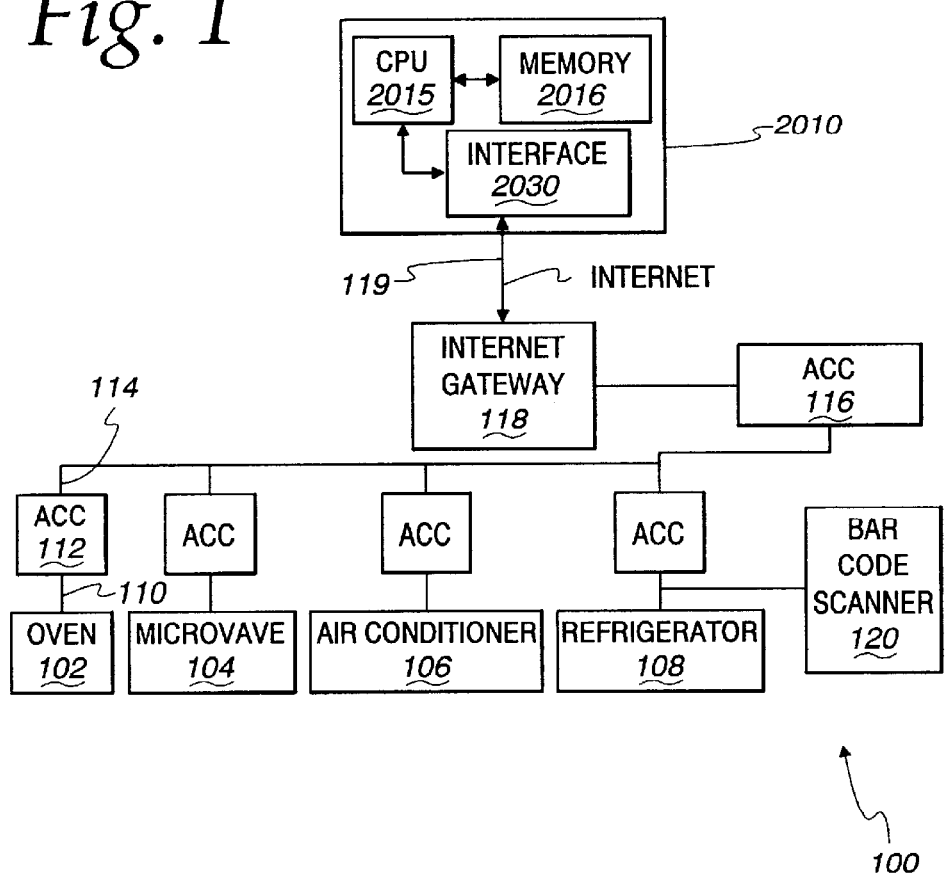

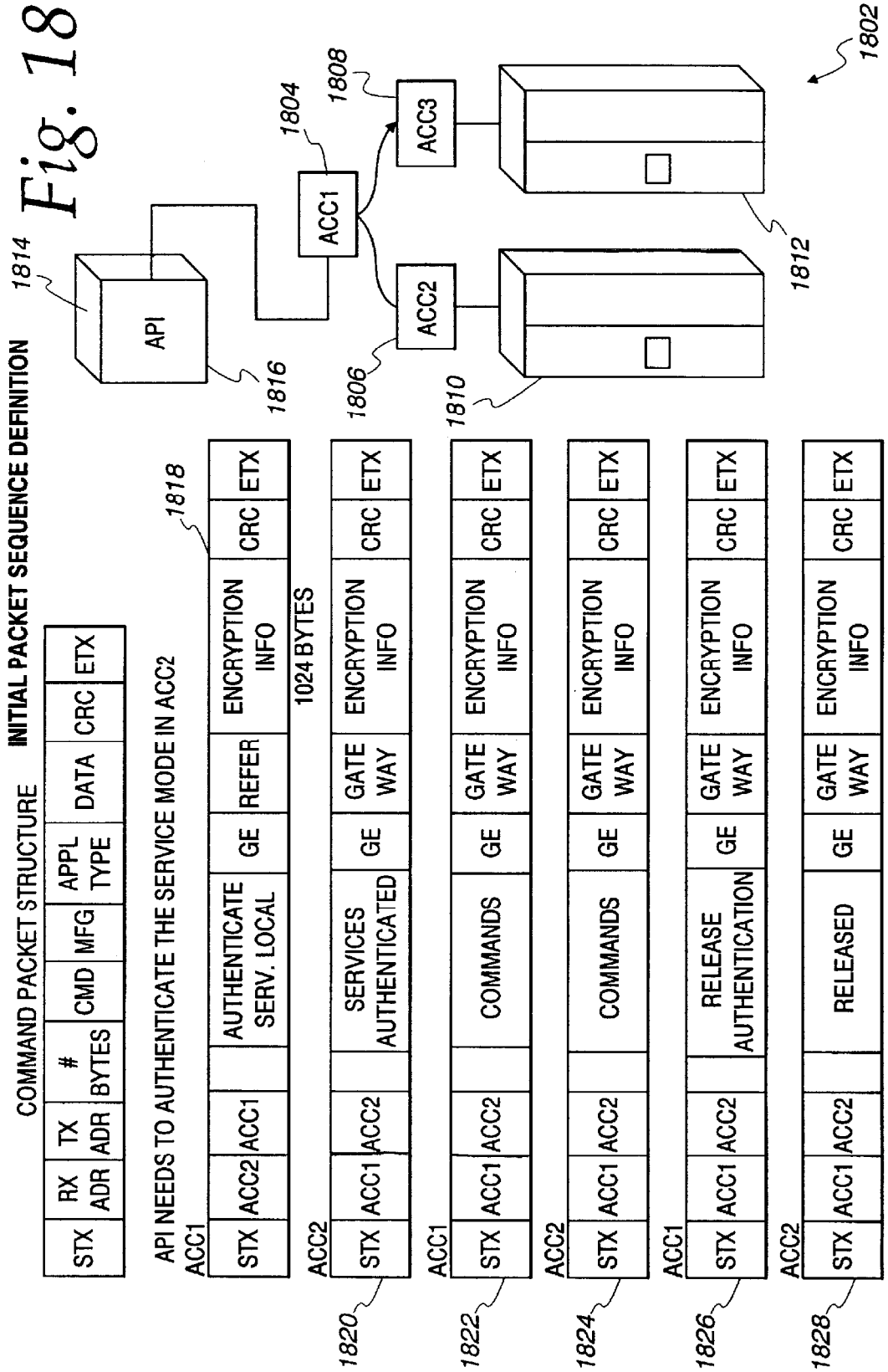

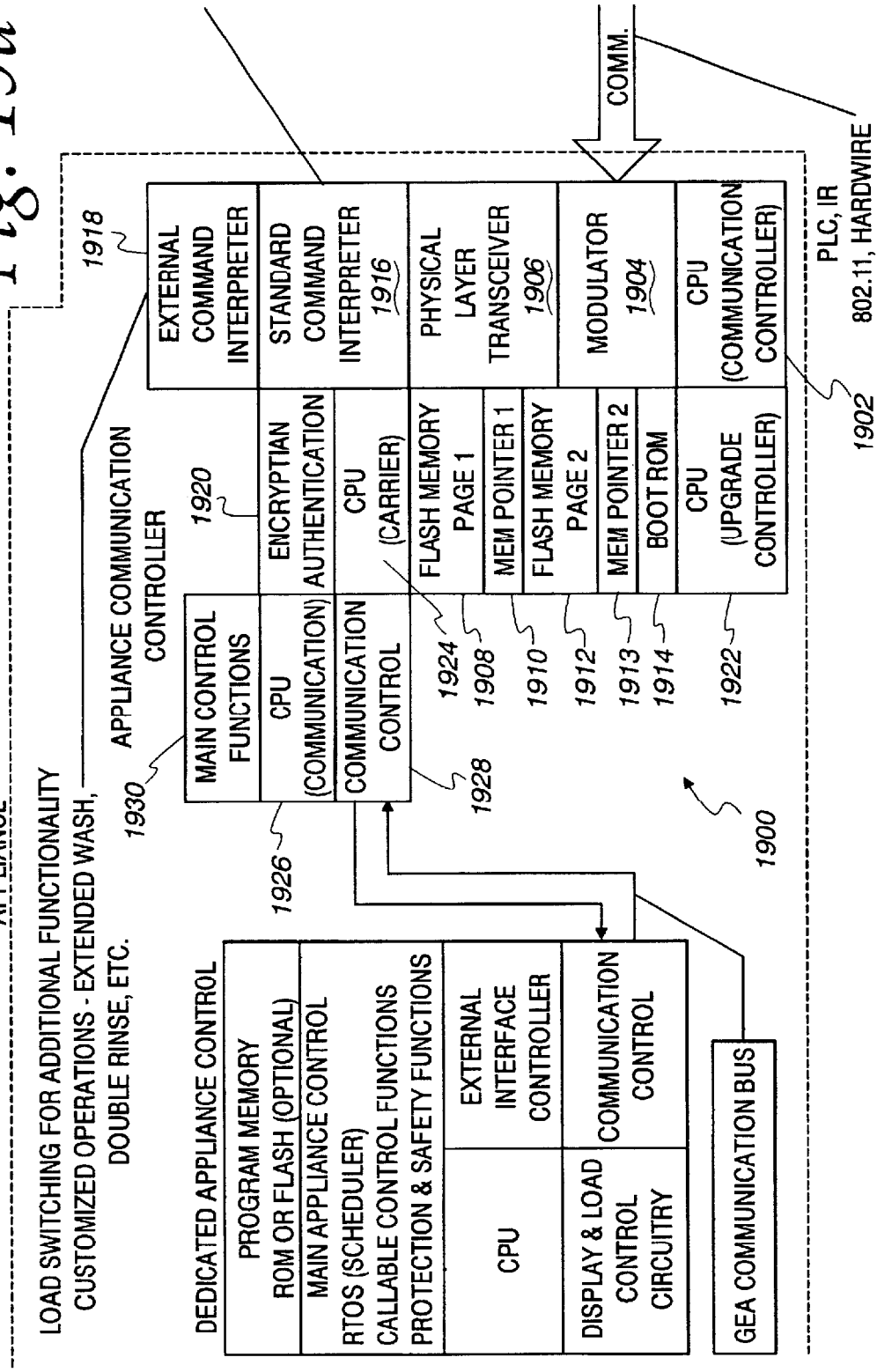

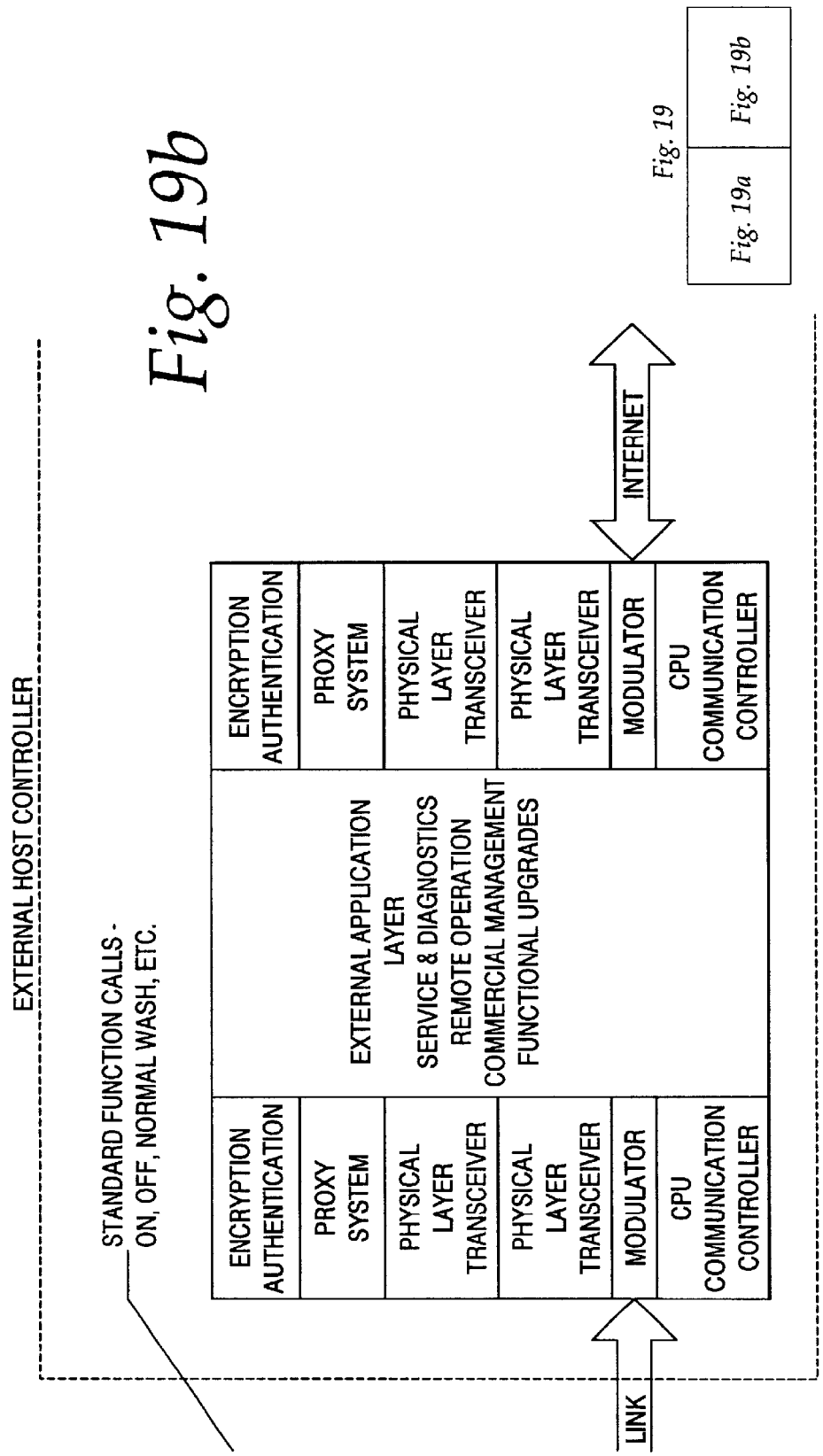

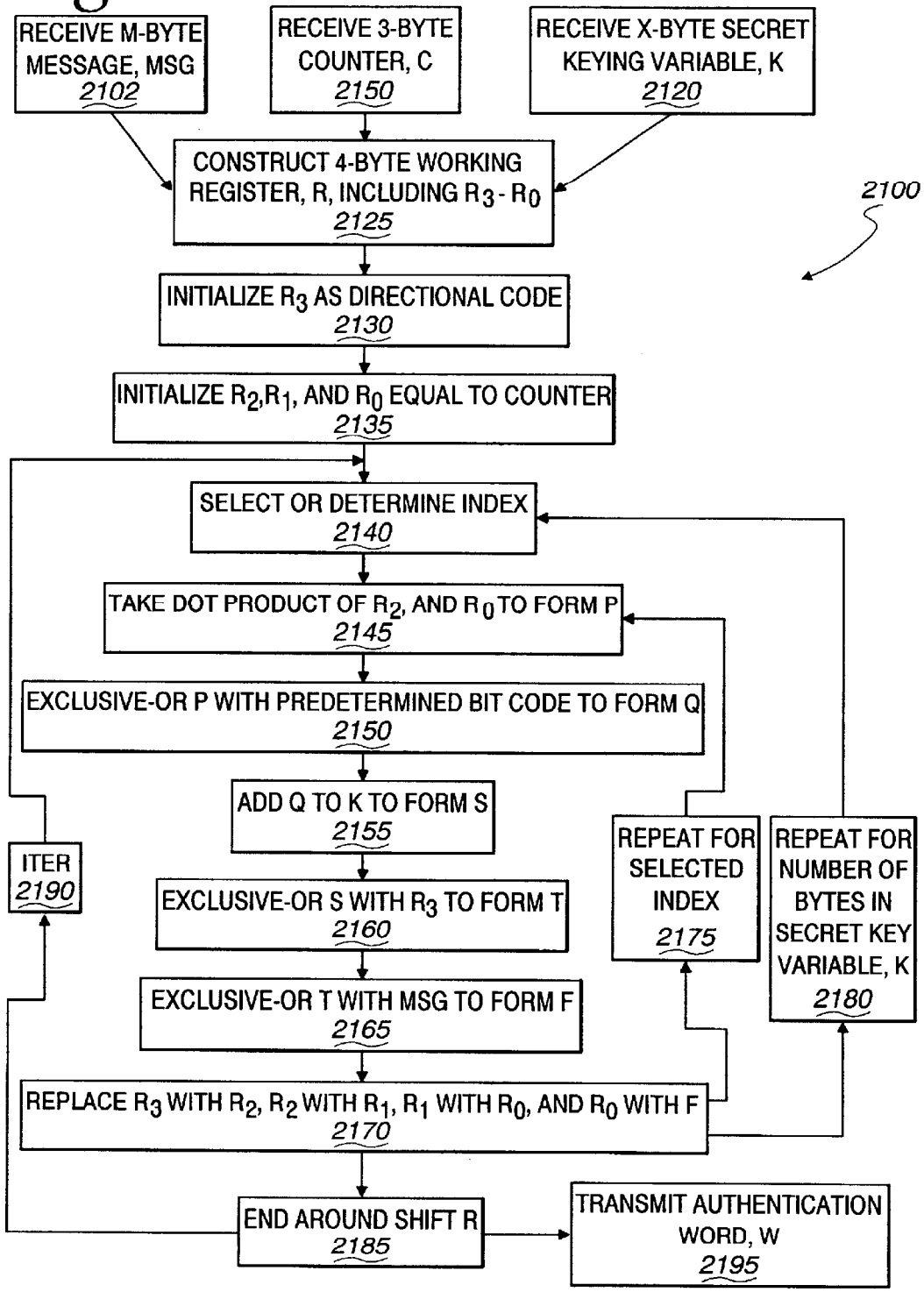

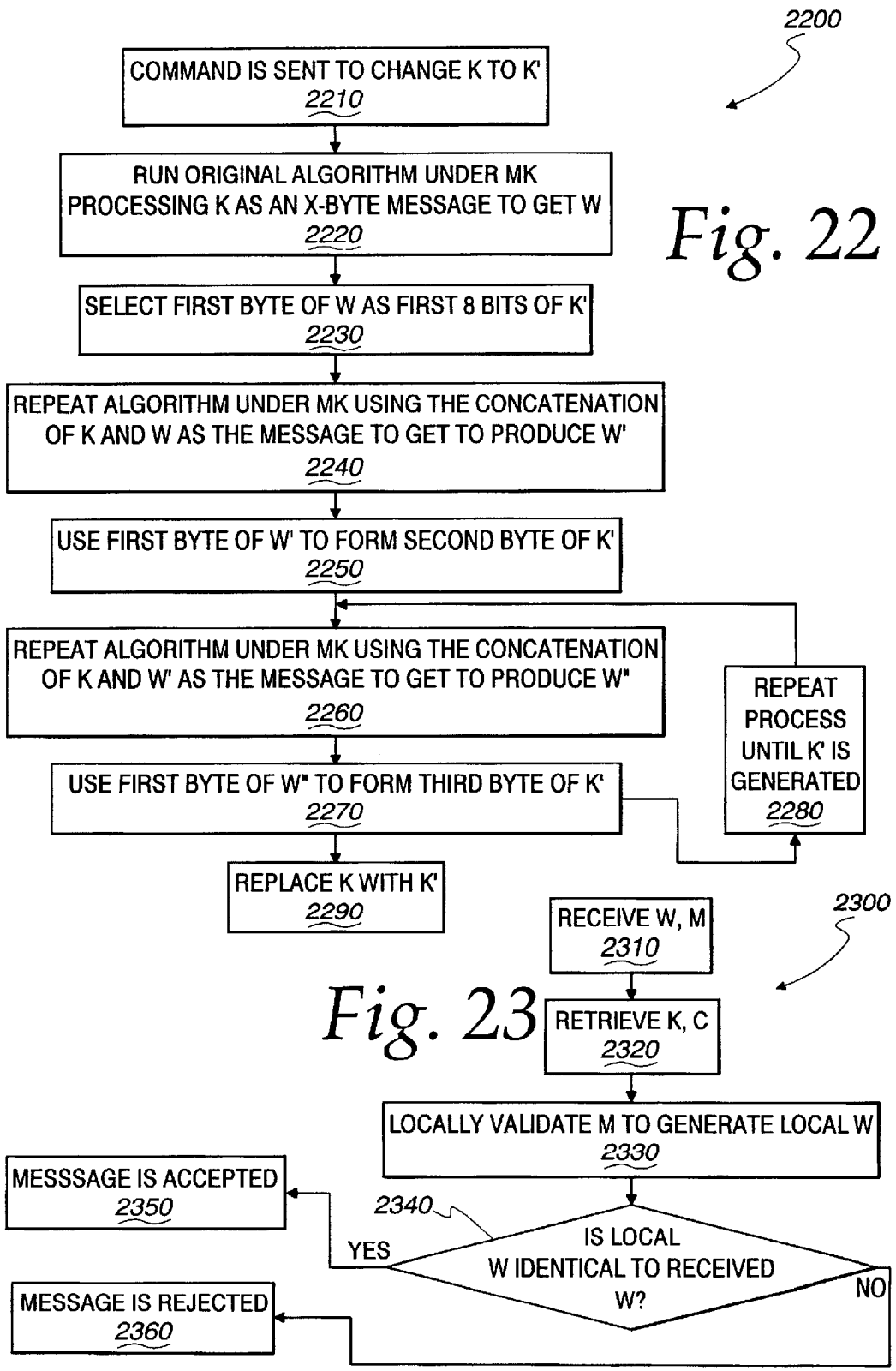

INTERNET ENABLED APPLIANCE COMMAND STRUCTURE

CROSS REFERENCE TO RELATED APPLICATION

The applicants claim priority based on provisional application No. 60/219,086, filed Jul. 18, 2000 in the names of Daum, Holmes, Bicknell, Homing, Iqbal, Hooker, Bultman, Ziqiang, Evans and Hershey, entitled "Internet Enabled Appliance Command Structure."

BACKGROUND OF THE INVENTION

The present invention relates to home appliances such as refrigerators, dishwashers, and air conditioners. In particular, the present invention relates to a command structure that provides communication between network enabled appliances.

Appliances of the past were stand alone devices, operating on their own without cooperation between or communication among other devices. As a result (as one example) great expenditures of time and effort by repair personnel were required to diagnose problems in an appliance and to take corrective action. As another example, the current and proper operation of an appliance generally could not be determined without being physically present at the appliance. Thus, for example, whether or not the gas burner in a stove had been left on could not be determined without physical inspection.

A need has long existed in the industry for an Internet enabled appliance command structure that addresses the problems noted above and others previously experienced.

U.S. Pat. No. 5,909,183 (Borgstahl et al., filed Dec. 26, 1996, the "'183 Patent") describes an interactive appliance remote controller, system and method. FIG. 3 shows appliances such as a television, radio, CD player, copier, telephone and watch. FIG. 6 shows that the appliances are addressed by an authorization process and that a connection with an appliance may begin by sending a need and capability messages that include code identifying various operations (FIGS. 7 and 8), such as appliance personalization, hard copy, visual image, audio, financial transactions and lock/unlock. If the needs and capabilities match, connection to the appliance is made by a process shown in FIG. 10. An appliance control program is uploaded to the appliance and control data is receive by a service receiving appliance over a service connection (Col. 10, lines 52–59). The appliance is then controlled. FIG. 2 illustrates a controller for the appliance, and FIGS. 20–25 describe setting of a remote controller for an appliance (Col. 16, lines 15–17). FIG. 21 illustrates a sequence of data exchange messages between a controller and an appliance. The appliance sends a set of commands/actions it can perform at the behest of the controller (Col. 16, lines 45–50).

Although the '183 Patent describes control of an appliance based on a control program and data related to various operations identified by code, the Patent does not teach or suggest any data structure for accomplishing the stated goals. The preferred embodiment of the present invention overcomes this problem by including a command structure that facilitates appliance control via the Internet.

U.S. Pat. No. 6,229,433 B1 (Rye et al., filed Jul. 30, 1999) and U.S. Pat. No. 6,121,593 (Mansbery et al., filed Aug. 19, 1998) describe control of an appliance over an AC power line. U.S. Pat. No. 6,243,772 B1 (Ghori et al., filed Jan. 31, 1997) describes coupling of a personal computer with an appliance unit via a wireless communication link. U.S. Pat. No. 6,041,346 (Chen et al., filed Oct. 17, 1997) describes upgrading an internet appliance (FIG. 4). An appliance security system is described in U.S. Pat. No. 5,898,831. However, none of these patents cure the deficiencies of the '183 Patent.

SUMMARY OF THE INVENTION

The preferred apparatus embodiment of the invention is useful for controlling an appliance. In such an environment, the preferred embodiment comprises a source of command fields for the appliance. The command fields include context subfields defining operating modes and command subfields defining operations to be performed within the context subfields. A network transmits the command fields between the source and the appliance. A controller processes the command fields so that an operation defined by one of the command subfields is performed.

The preferred method embodiment of the invention also is useful for controlling an appliance. In such an environment, the preferred embodiment comprises transmitting command fields for the appliance. The command fields include context subfields defining operating modes and command subfields defining operations to be performed within the context subfields. The command fields are processed so that an operation defined by one of the command subfields is performed.

By using the foregoing techniques, appliances may be controlled with a degree of sophistication, ease and economy previously unattainable.

BRIEF DESCRIPTION OF THE DRAWINGS

FIG. 1 illustrates an appliance communication network.

FIG. 2 shows a command frame for communicating over the appliance network.

FIG. 18 shows an example of context switch authentication.

FIG. 19 shows an example of an appliance communication controller.

FIG. 21 illustrates a flow diagram of the cryptographic algorithm used to generate an authentication word.

FIG. 22 shows a flow diagram of modifying a secret keying variable K using a master secret keying variable, MK.

FIG. 23 illustrates a flow diagram of the authentication process.

DETAILED DESCRIPTION OF THE INVENTION

Figure 3:
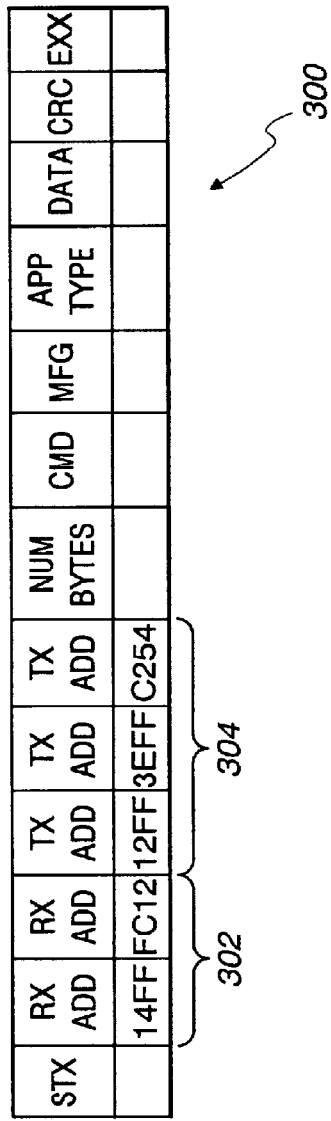
FIG. 3 depicts a command frame with extended fields.

Turning to FIG. 1, that figure illustrates an appliance network 100 including a range or oven 102, a microwave 104, an air conditioner 106, and a refrigerator 108. As an example, the oven 102 connects through a serial bus 110 to an Appliance Communication Controller (ACC) 112. The ACC 112 connects to and communicates over the power line 114 to the ACC 116. The ACC 116, in turn, connects to an Internet gateway 118, such as that provided by a laptop or desktop computer (e.g., through a modem dial-up, T1 line, and the like). Gateway 118 connects through a network 119, such as the Internet, to a central facility 2010 that is shown in more detail in FIG. 20. Facility 2010 is located remotely from the appliances and includes a central processing unit (CPU) 2015, a communication interface 2030 and a memory 2016 connected as shown. The applicant network 100 also includes a bar code scanner 120 that provides additional input flexibility. As will be described in more detail below, the appliance network 100 provides a command structure for secure bidirectional communication of appliance related data over a public access network. The command structure includes extendable addressing and commands, identifiers to ensure connection to the correct appliance, and support for context sensitive commands. The command structure may be stored in memory 2016 or the appliances. Alternatively, a portion of the command structure may be stored in the appliances and a portion of the command structure may be stored in memory 2016.

The command structure may be used over any multidrop network including Ethernet over 10 base T, power line carrier, RS422, and the like. The preferred embodiment uses a power line carrier. Power line carrier communication modules are manufactured, for example, by Domosys.

Turning next to FIG. 2, that figure shows a command frame 200 divided into multiple fields. FIG. 2 shows each field name, and the number of bits for each field. The fields are as follows:

STX—8 bits—Start of Transmission (the preferred pattern is 0x02).

RX ADD—16 bits—Receiver address. RX ADD is a 16 bit extendable field. 256 values of the 65536 possible values are reserved for broadcast and extension addresses. The address 00FF is reserved for broadcast messages. Other addresses ending in FF translate the address field to the extended field as explained below.

TX ADD—16 bits—Transmitter address. TX ADD is a 16 bit extendable field. 256 values of the 65536 possible values are reserved for extension addresses. Extension addresses end in FF and translate the address field to the extended field.

NUM BYTES—16 bits—Number of Bytes. NUM BYTES gives the number of bytes that follows in the command frame, excluding the ETX bits. Thus, messages sizes may be as large as 65536+ETX+TX ADD+RX ADD+STX bytes.

CMD—16 bits—CMD defines the command to be issued to the appliance. This is a 16 bit extendable field. 256 values of the 65536 possible values are reserved for extension addresses. Extension addresses end in FF and translate the address field to the extended field. As explained in more detail below, this field may contain a context switch command as well as control commands.

MFG—16 bits—MFG defines the manufacturer of the appliance. This is a 16 bit extendable field. 256 values of the 65536 possible values are reserved for extension addresses. Extension addresses end in FF and translate the address field to the extended field.

APPL TYPE—16 bits—APPL TYPE is the appliance type field and defines the type of appliance which participates in context switching. APPL TYPE is a 16 bit extendable field. 256 values of the 65536 possible values are reserved for extension addresses. Extension addresses end in FF and translate the address field to the extended field.

DATA—variable bits—The DATA field is typically used in conjunction with the CMD field. As examples, the DATA field may include encryption, display data, software updates, diagnostic commands, remote control access, and the like.

CRC—12 bits—The CRC field provides a 12 bit cyclic redundancy check computed over all bytes of the data packet except for the STX and ETX bytes, and the CRC field itself.

ETX—8 bits—ETX provides an End-of-Transmission character, preferably 0x03.

As noted above, several of the command frame fields are extendable. Field extension allows increasing a selected field in increments of 8 bits. Thus, for example, a 16 bit field may be extended to a 24 bit field. If it is determined that more than 24 bits are needed, then the 24 bit field may be extended to a 32 bit field, and so on.

FIG. 3 shows an example of a command frame 300 that extends the RX address field 302 to a 24 bit field. As shown, the RX address field holds the address 14FC12. The command frame also shows the TX address field 304 extended to 32 bits and holding the address 123EC254.

Note, however, that alternative command frames may be used, such as the CEBus™ command frame.

Each appliance may support one or more contexts. Contexts define a current mode of operation for the appliance, and thus may be used to accept or reject certain commands that are valid only in certain contexts. The contexts may include, as examples:

Service and Technology using local access, which includes commands directed by appliance field service technicians working within the home, and manufacturer engineering community developing products in their laboratories.

Service and Technology using remote access, which includes commands directed by appliance manufacturers product service organizations accessing remotely via the internet. Such access would be restricted from certain functionality, such as activating a burner on a cook-top Manufacturing, which includes commands directed by the appliance manufacturer on the factory floor for diagnostic testing, calibration, writing configuration parameters, etc. This community could also be used by the manufacturer to download new firmware to the appliances after they are already installed in the field.

Sales & Marketing, which includes commands directed by dealers on the showroom floor to demonstrate features to potential customers without necessarily activating all the loads. For instance, all the features of a microwave could be activated without actually turning on the magnetron.

Customer & Consumer Local Access, which includes commands directed by the product owner, or anyone granted access by the product owner, when that person(s) has access to the product in his immediate vicinity (i.e. access directly through the power line).

Customer & Consumer Remote Access, which includes commands directed by the product owner, or anyone granted access by the product owner, when that person(s) does not have access to the product in his immediate vicinity (i.e. has to go over the internet). Such access would be restricted from certain functionality, such as activating a burner on a cook-top.

Other Appliances and Extensions, which includes commands directed by other appliances or products. Such as a dishwasher signaling a hot water heater that it is about to demand x gallons of water, or a clothes dryer signaling a TV that it has finished its cycle so the appropriate message can be displayed.

Security, which includes commands directed to changing the user community context.

Context selection, and the resulting additional control or access provided in a certain context, is controlled through encryption in the command frame 200. For example, encrypted commands may be provided in the DATA field, as explained in the encryption section below.

In one implementation, context switching occurs as a result of a command that is not understood by the appliance or the ACC at the appliance or a command that is not allowed in the currently active context. When the appliance or the ACC receives a command that it does not understand or a command that is not allowed in the current context one of two responses preferably occur. In one embodiment the appliance or ACC will query the gateway or the server for a context switch. The gateway or server will determine if a context switch is allowed.

If the context switch request is valid then the server or gateway will determine if the context switch can be done locally (within the ACC) via a single command, within the LAN (from the gateway or server to the ACC) or across the internet. As an example, an Internet download may also be a fee based context switch. Such fee based context switches may be used for diagnostics, service, and other features for which a fee will be charged.

In general, each ACC will have a unique multi-bit address, including an 8-BIT extendable building identifier prefix, while an appliance will have a unique serial number and a model number. The ACC is cognizant of the appliances to which it is connected by communicating with the appliances, for example, to discover their serial number and model number. To switch contexts, an authorization string may be transmitted in the command frame 200, e.g., API->Node Number "Request Community N" (INCL BLDG #). The appliance may then authenticate the message and reply "Authorized for community N" (INCL BLDG #) or "Authorization not recognized". When authorization is available, the node may, for example, remain authorized for a predetermined time (e.g., 5 minutes).

Additional commands are provided for explicit Deauthorization, bus arbitration (e.g., where one node becomes bus master, another node is a slave, and all other nodes "hold off" the bus). A command may also be provided to turn Free hold off (i.e., release all nodes from the hold off state so that they can try to gain control of the bus via arbitration, where hold off is the term used to describe the condition of nodes which are inhibited from talking while the secure context switching transaction is completed), and for Authorization standby (i.e., the temporary mode used to describe the condition where request for authorization to switch to a new context has been submitted, but waiting back for the response from the authorizing entity).

Figure 4:
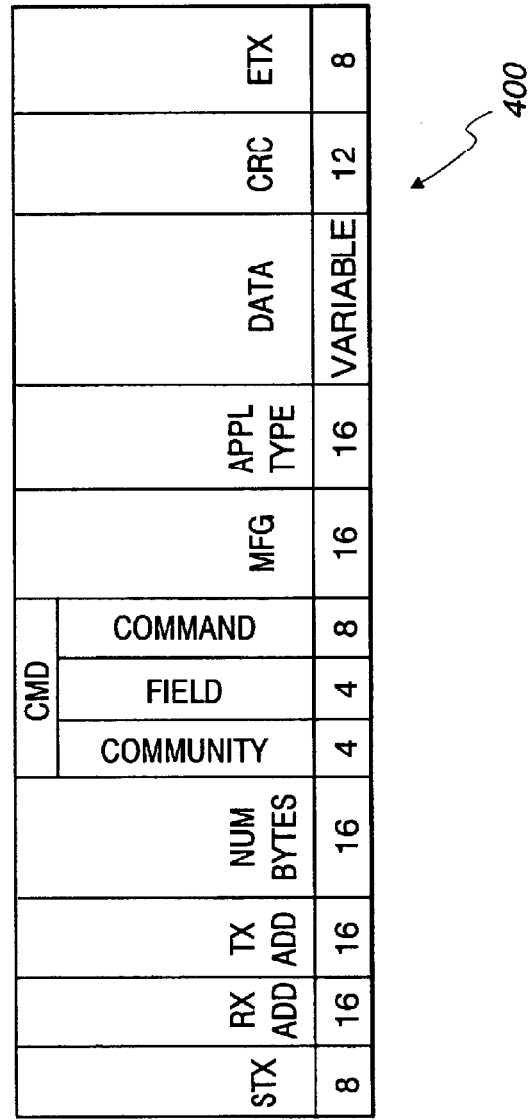
FIG. 4 illustrates a command frame with a subdivided CMD field for User Community, Field, and Command.

Appliances receive command frames over the appliance network 100 and respond appropriately. To this end, the CMD field may be split into subfields as shown in FIG. 4. Preferably, the CMD field includes a 4-bit User Community field, a 4-bit Field field, and an 8-bit Command field. The User Community specifies the highest level of the command structure, the Field field specifies a second level, and the Command field specifies the command within the User Community and Field to perform. Command structures may be stored in a memory in the appliance itself or the ACC connected to the appliance. Thus, for example, when an ACC receives a command from another device in the appliance network 100, the command will be translated into an action for the appliance to perform.

Figure 5:
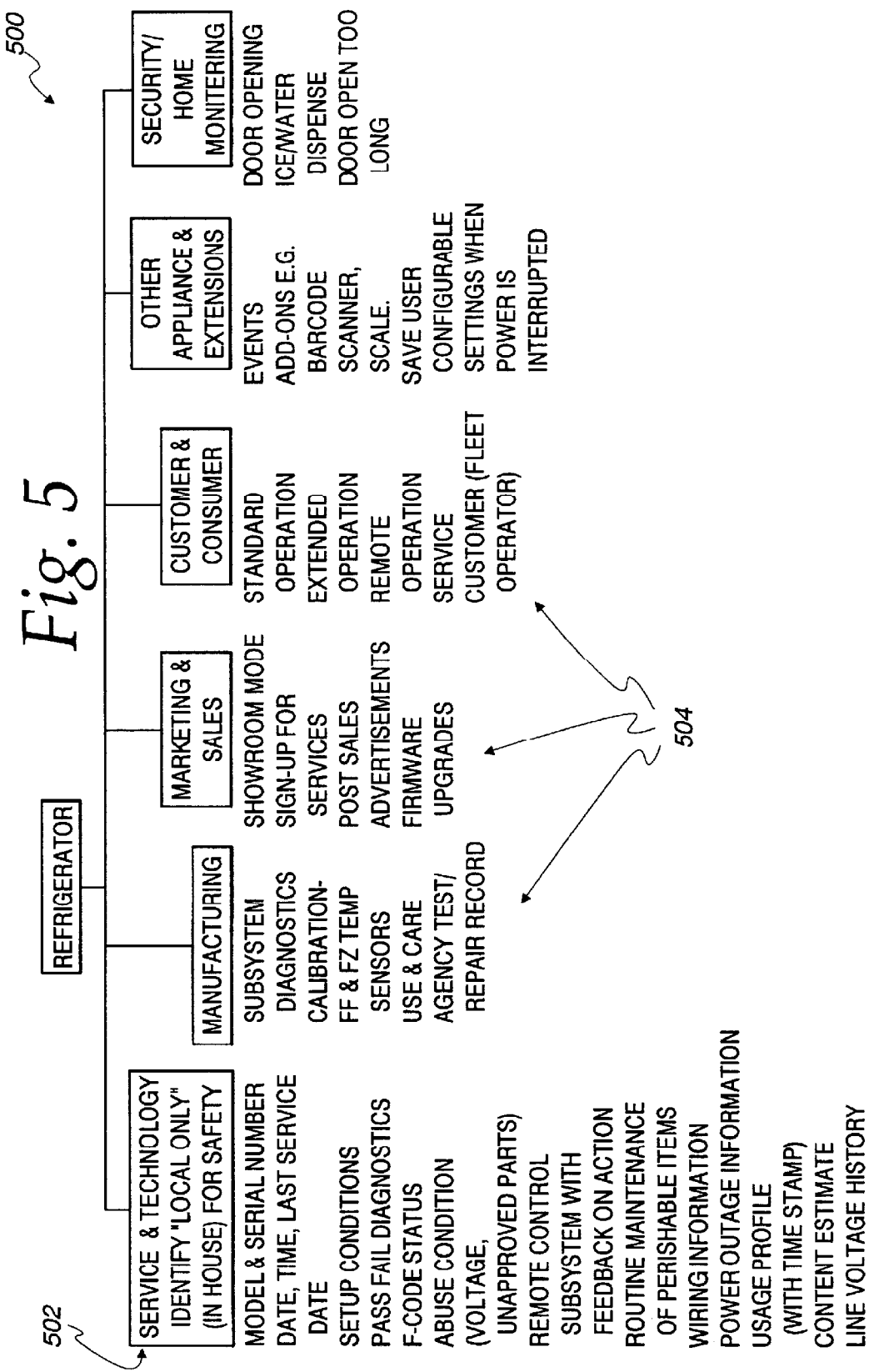
FIG. 5 shows a command structure for a refrigerator.

FIG. 5 shows an exemplary command structure 500 for a refrigerator. The command structure 500 includes six User Communities (e.g., top level command hierarchies) generally designated 502. The User Communities include Service & Technology, Manufacturing, Marketing & Sales, Customer & Consumer, Other Appliance Extensions, and Security & Home Marketing. Under each User Community 502 is a set of Fields or Commands 504 that may be included in each User Community. As an example, the Security & Home Monitoring User Community includes the Door Opening, Ice/Water Dispensing, and Door Open Too Long Fields/commands.

Figure 6:
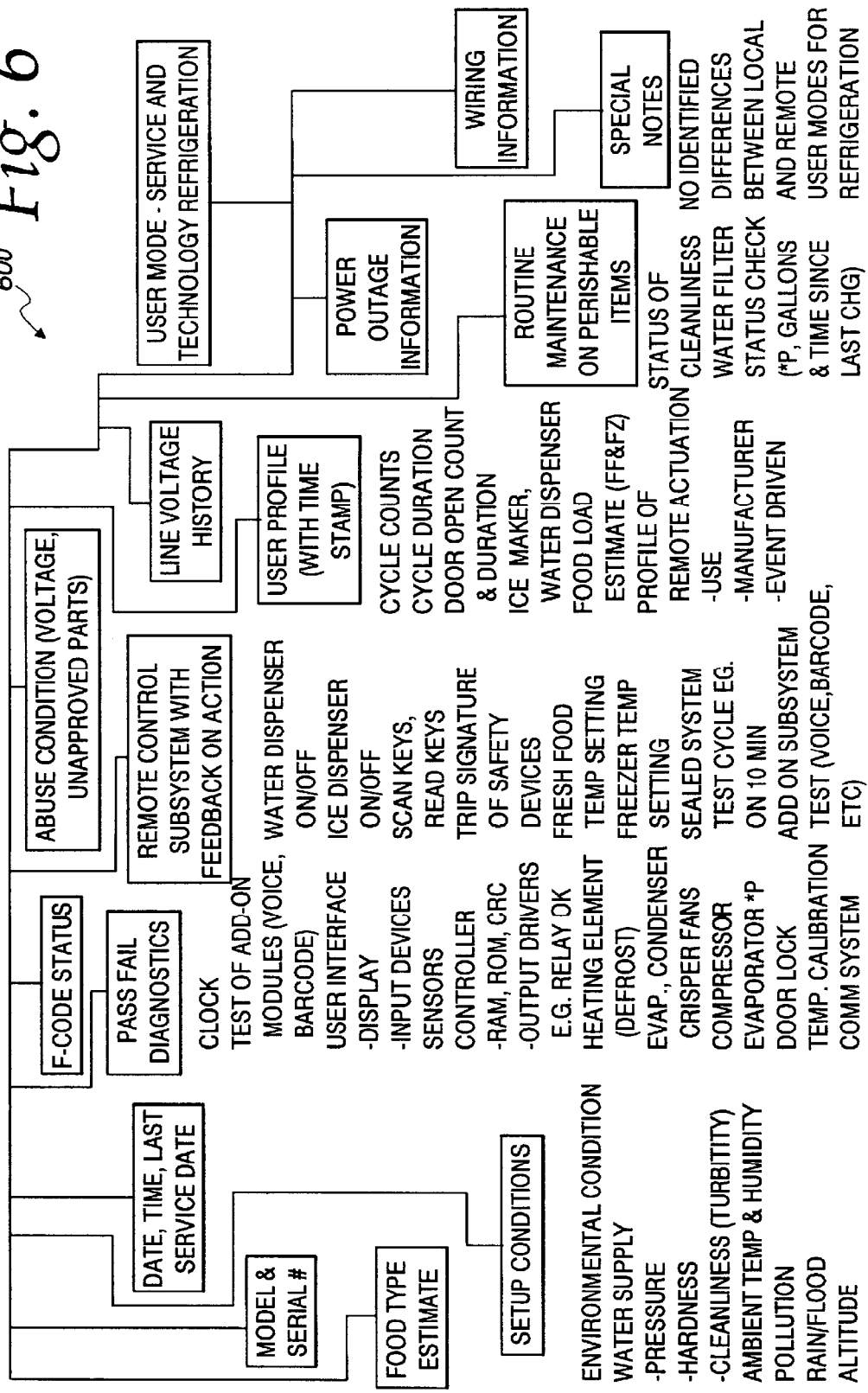
FIG. 6 shows Fields and Commands for a refrigerator command structure.

FIG. 6 illustrates a breakout 600 of exemplary Fields and commands under the Service & Technology User Community. Thus the refrigerator responds to commands that request information concerning Model & Serial Number; Date, Time, Last Service Date; Setup Conditions (a Field that includes Environmental condition commands to check the Water Supply pressure, hardness, cleanliness (turbidity), Ambient Temp & Humidity, Pollution, Rain/Flood, and Altitude); Pass-Fail Diagnostics including the Clock, Test of add-on modules (e.g., voice and barcode), User interface (e.g., Display and Input devices), Sensors, Controller (including RAM, ROM CRC, Output drivers (e.g., Relay checks), Heating elements (e.g., for defrost), Evaporation condenser, and crisper fans, Compressor, Evaporator, Door lock, Temperature calibration, Communication system, and the like.

Additional Fields and commands include the F-code status (i.e., the Fault condition), Abuse condition (e.g., line voltage, presence of unapproved parts), Remote control subsystem with feedback on action, including water dispenser on/off, ice dispenser on/off, scan keys, read keys, trip signature of safety devices, fresh food temp setting, freezer temp setting, sealed system test cycle (e.g., On for 10 minutes and watch for system response), add-on subsystem test (voice, barcode, and the like), Routine Maintenance of perishable hardware items including Status of cleanliness, Water filter status check (e.g., number of gallons & time since last change), Wiring information (e.g., Hot/Neutral reversed, open ground, and the like), Power outage information (e.g., via battery backed up real time clock), Usage profile (with time stamp) including Cycle counts, Cycle duration, Door open count & duration, Ice maker, water dispenser, Food load estimate, Profile of remote actuation by the User, Manufacturer, or Event driven, Food type estimate (e.g., via embedded bar code scanner or RF tag sensor), and Line voltage history.

The User Communities, Fields, and Commands are generally assigned binary identifiers that are subsequently used in the message frames. As an example, the CMD field may specify the Service and Technology User Community, the Remote Control Field, and the Command to turn on the water dispenser.

Figure 7:
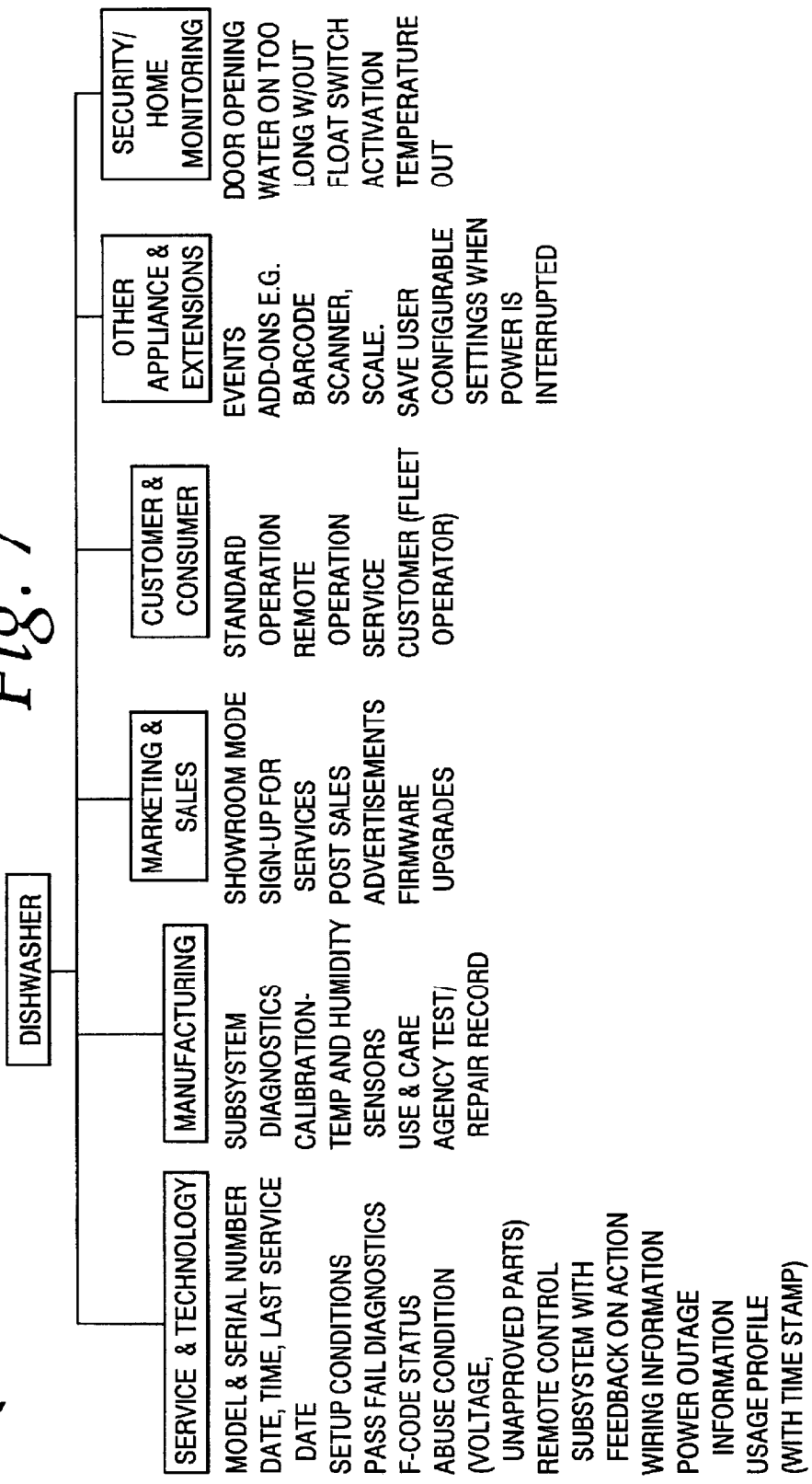
FIG. 7 shows a command structure for a dishwasher
Figure 8:
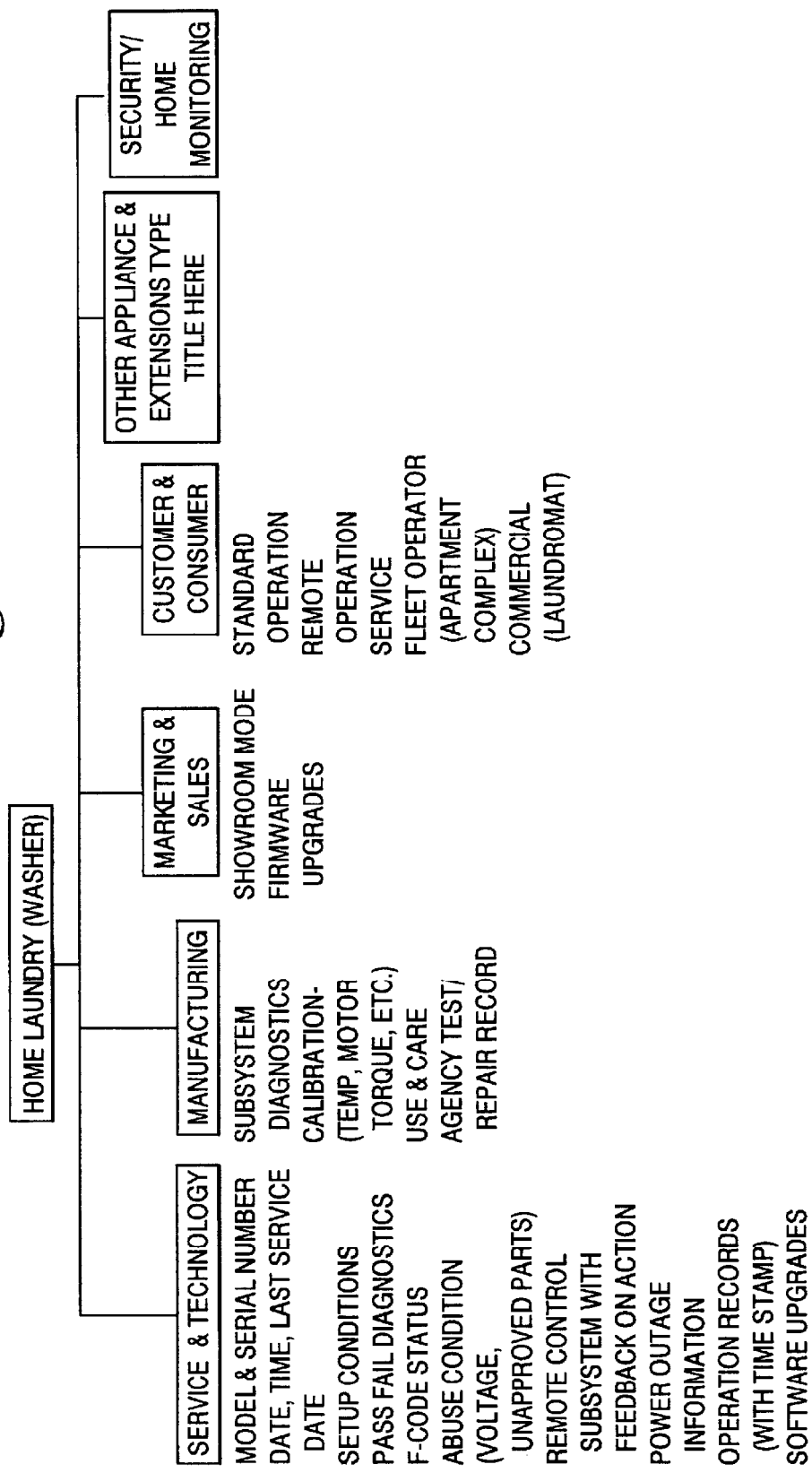
FIG. 8 illustrates a command structure for a home laundry washer.
Figure 9:
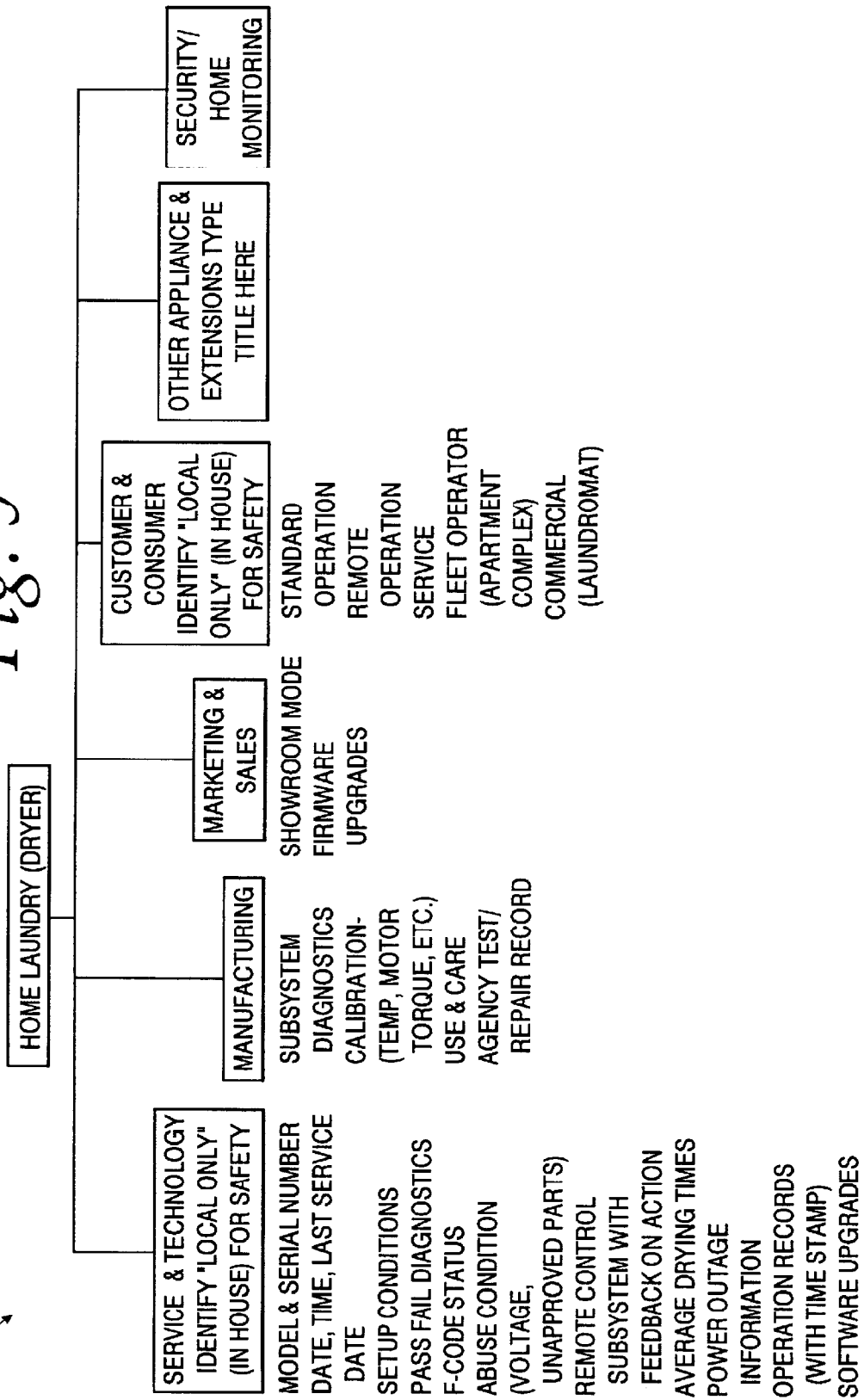
FIG. 9 illustrates a command structure for a home laundry dryer.
Figure 10:
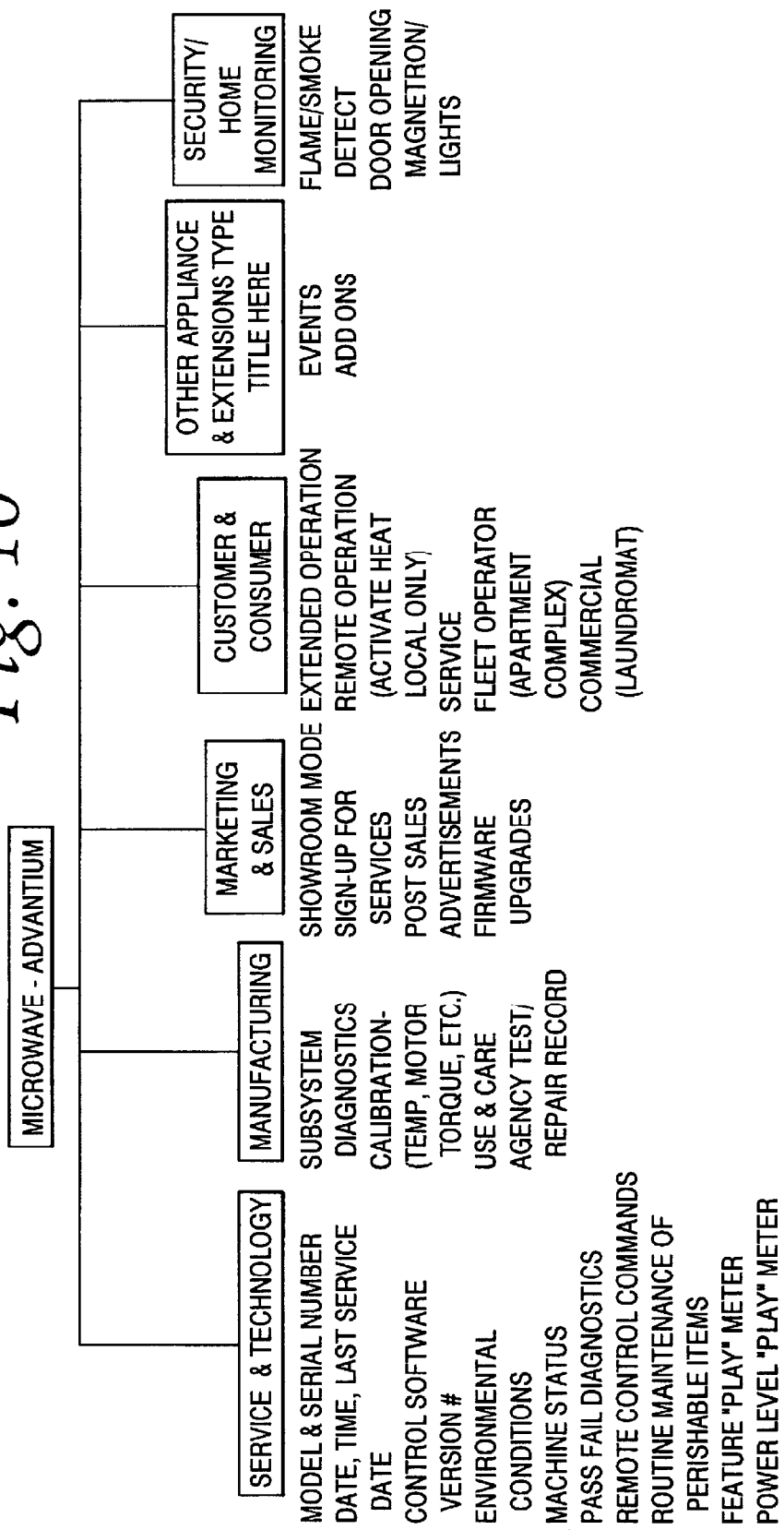
FIG. 10 depicts a command structure for an Advantium™ microwave oven.
Figure 11:
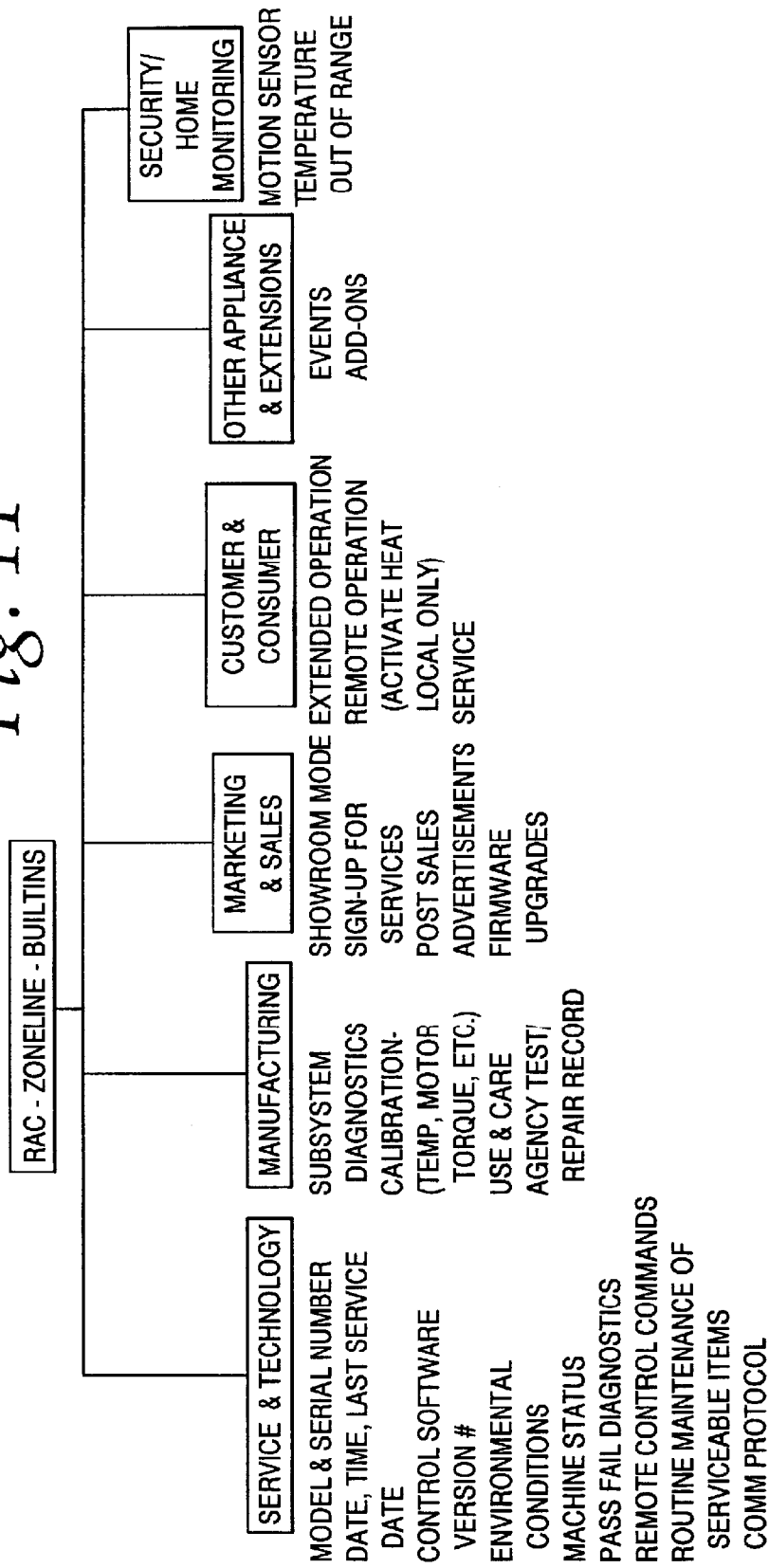
FIG. 11 shows a command structure for an air conditioner.
Figure 12:
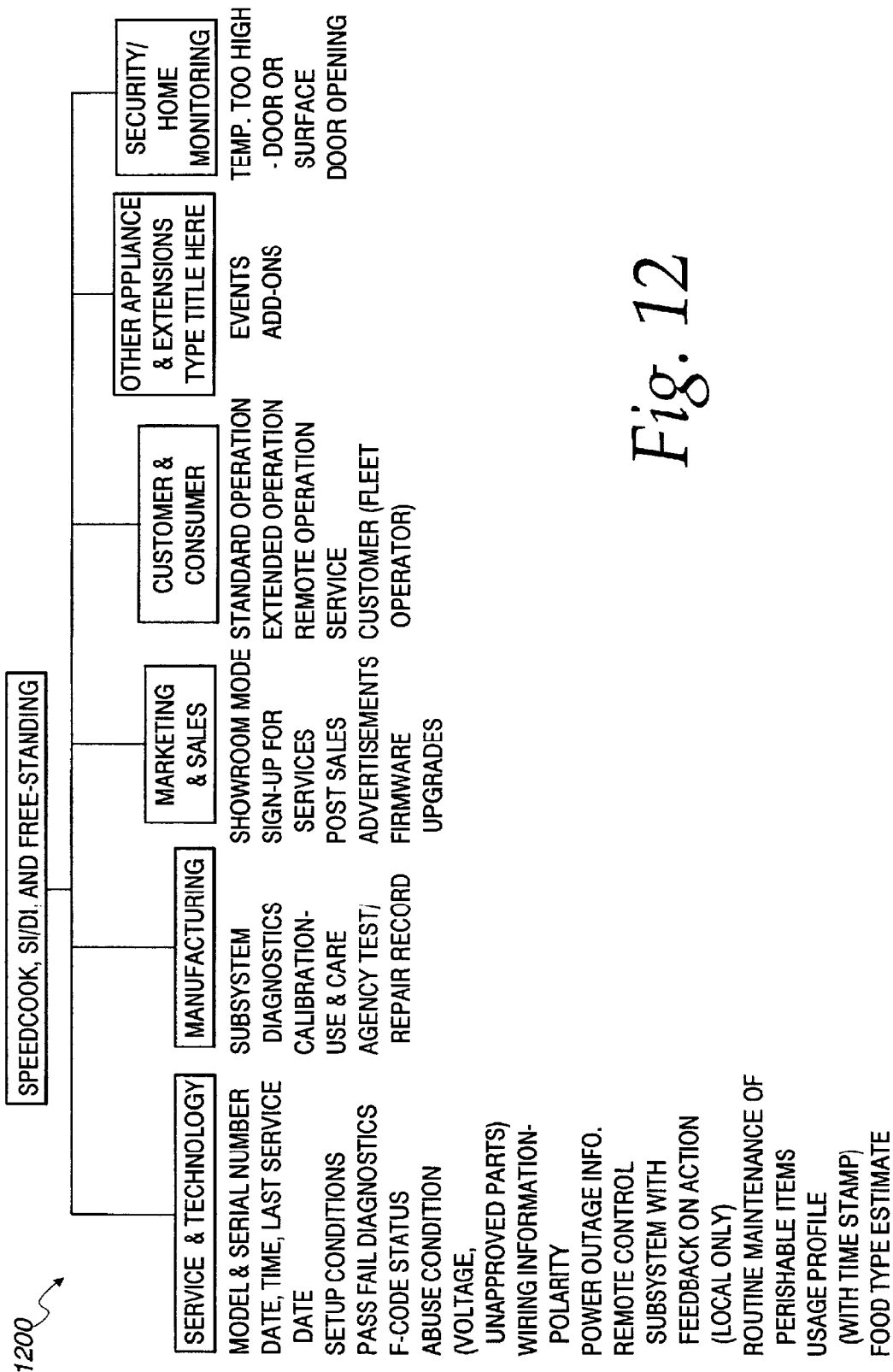
FIG. 12 illustrates a command structure for a range.
Figure 13:
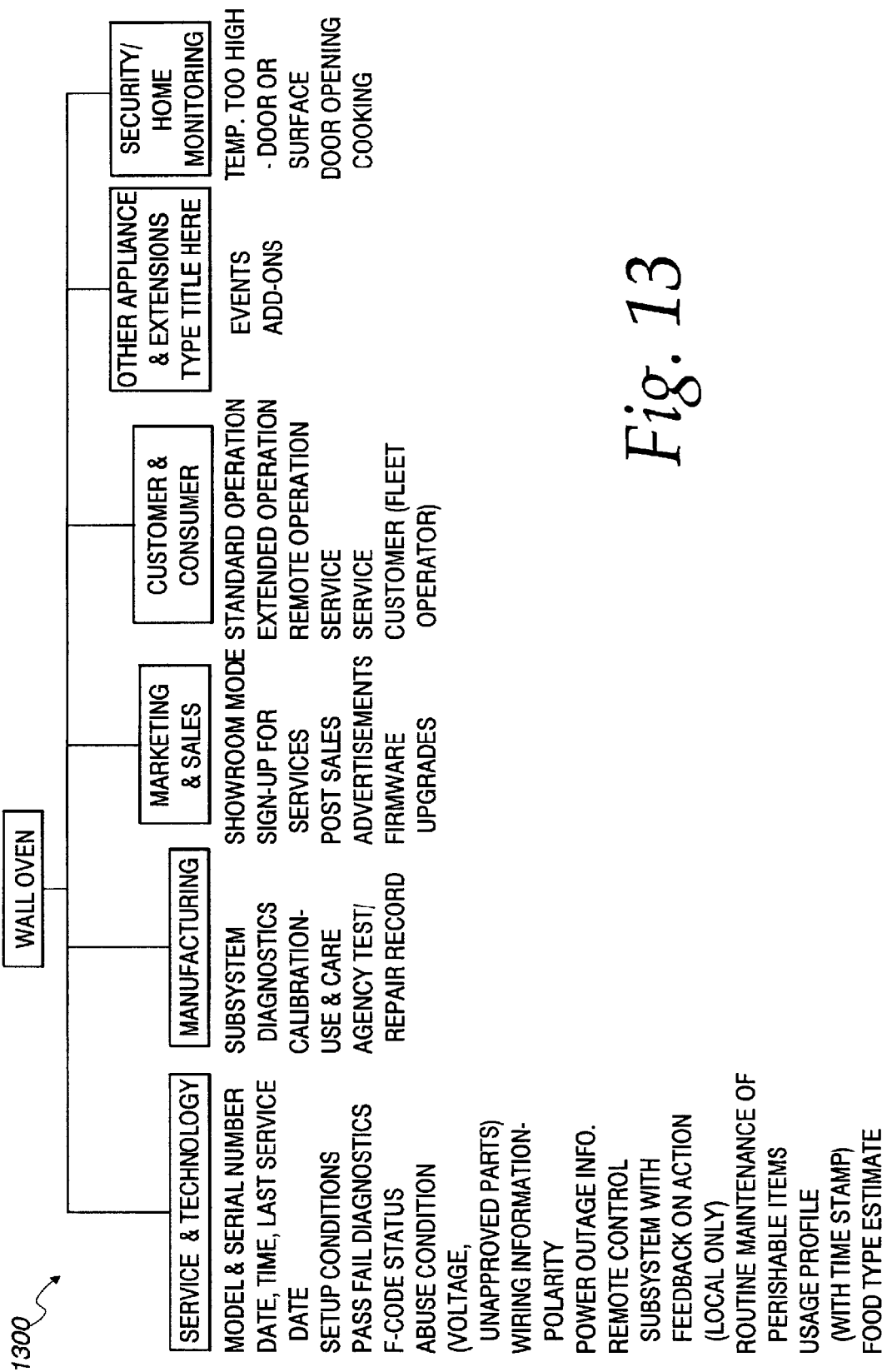
FIG. 13 illustrates a command structure for a wall oven.
Figure 14:
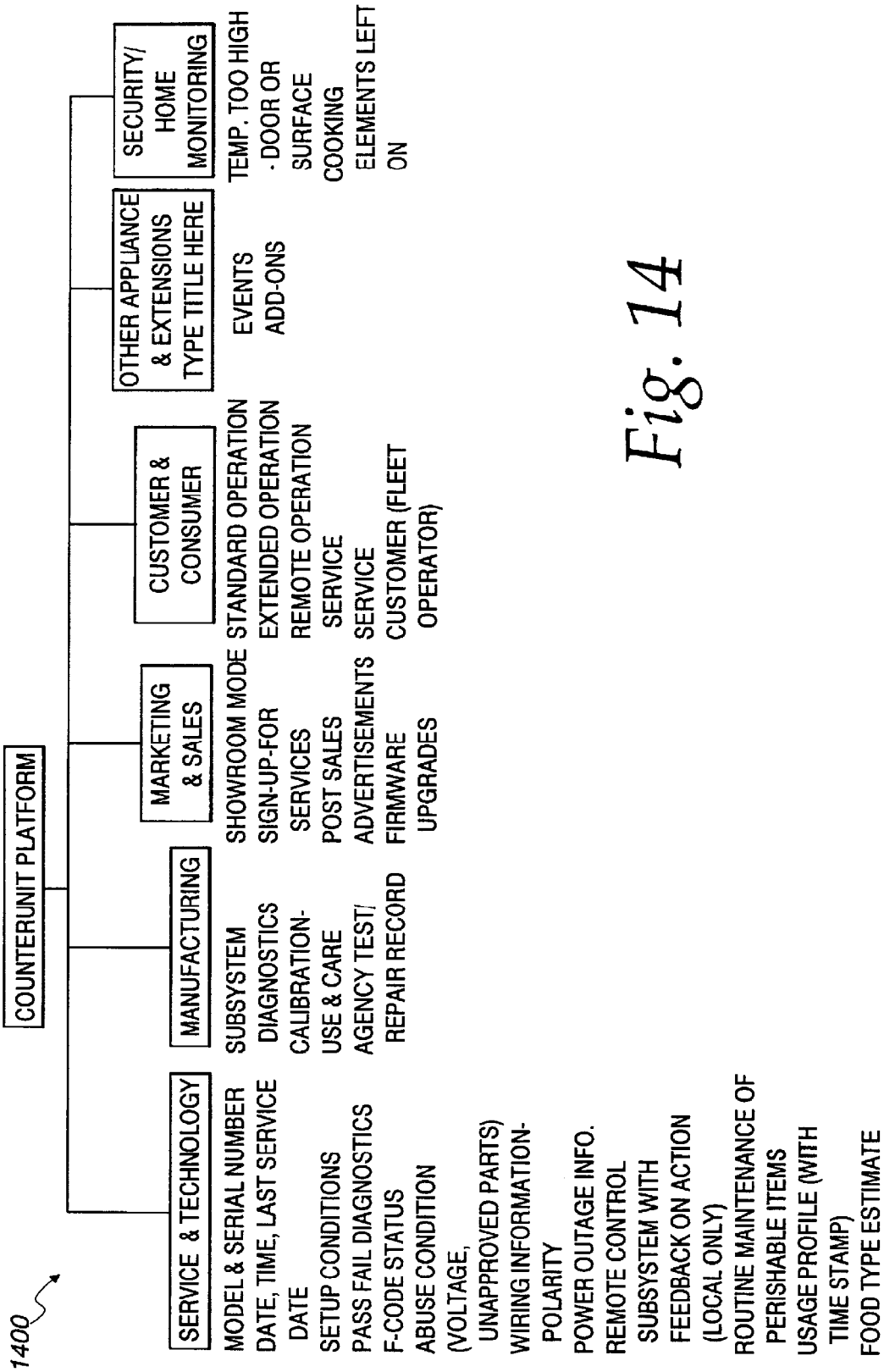
FIG. 14 depicts a command structure for a range counter unit.
Figure 15:
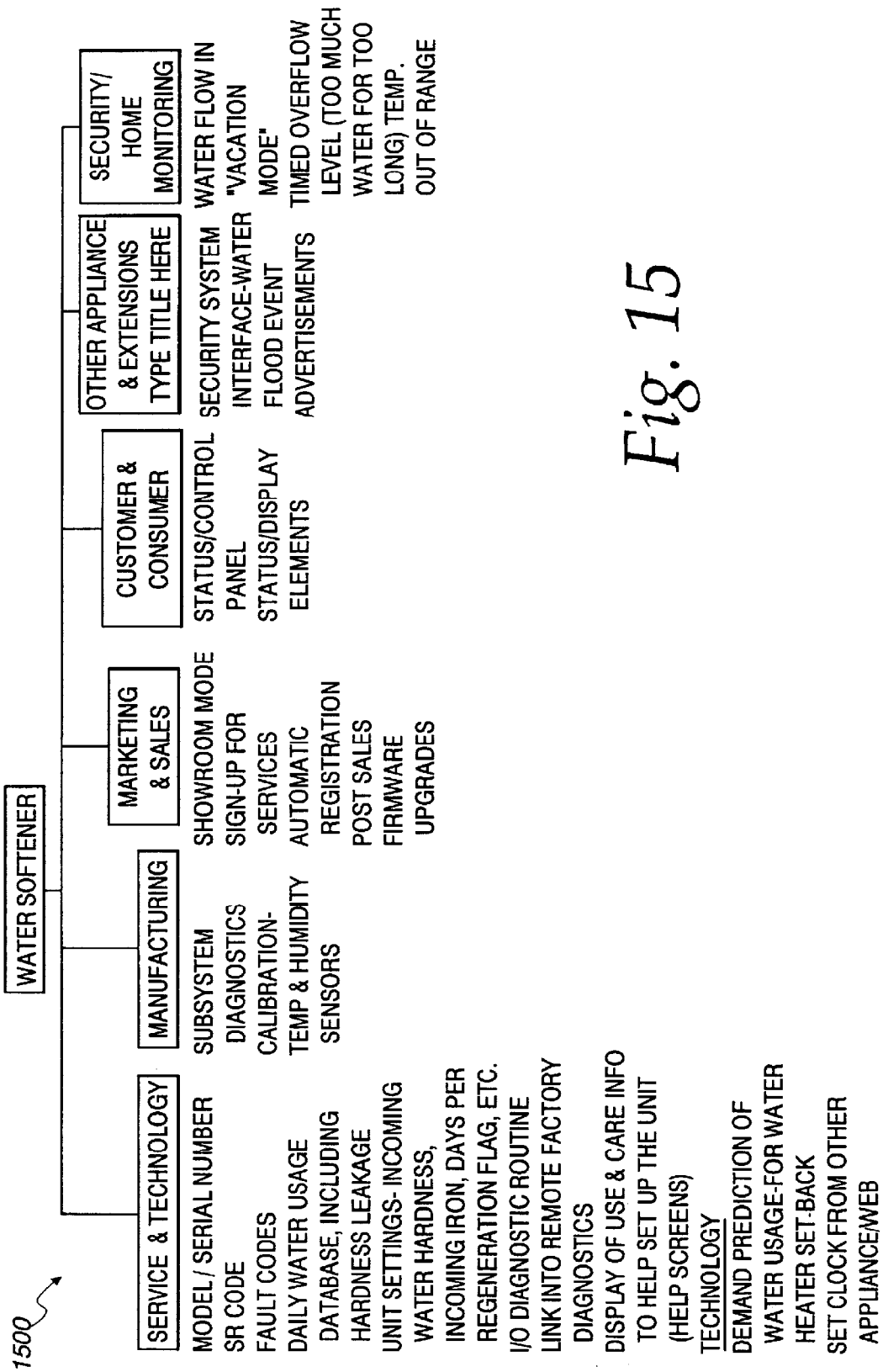
FIG. 15 shows a command structure for a water softener.
Figure 16:
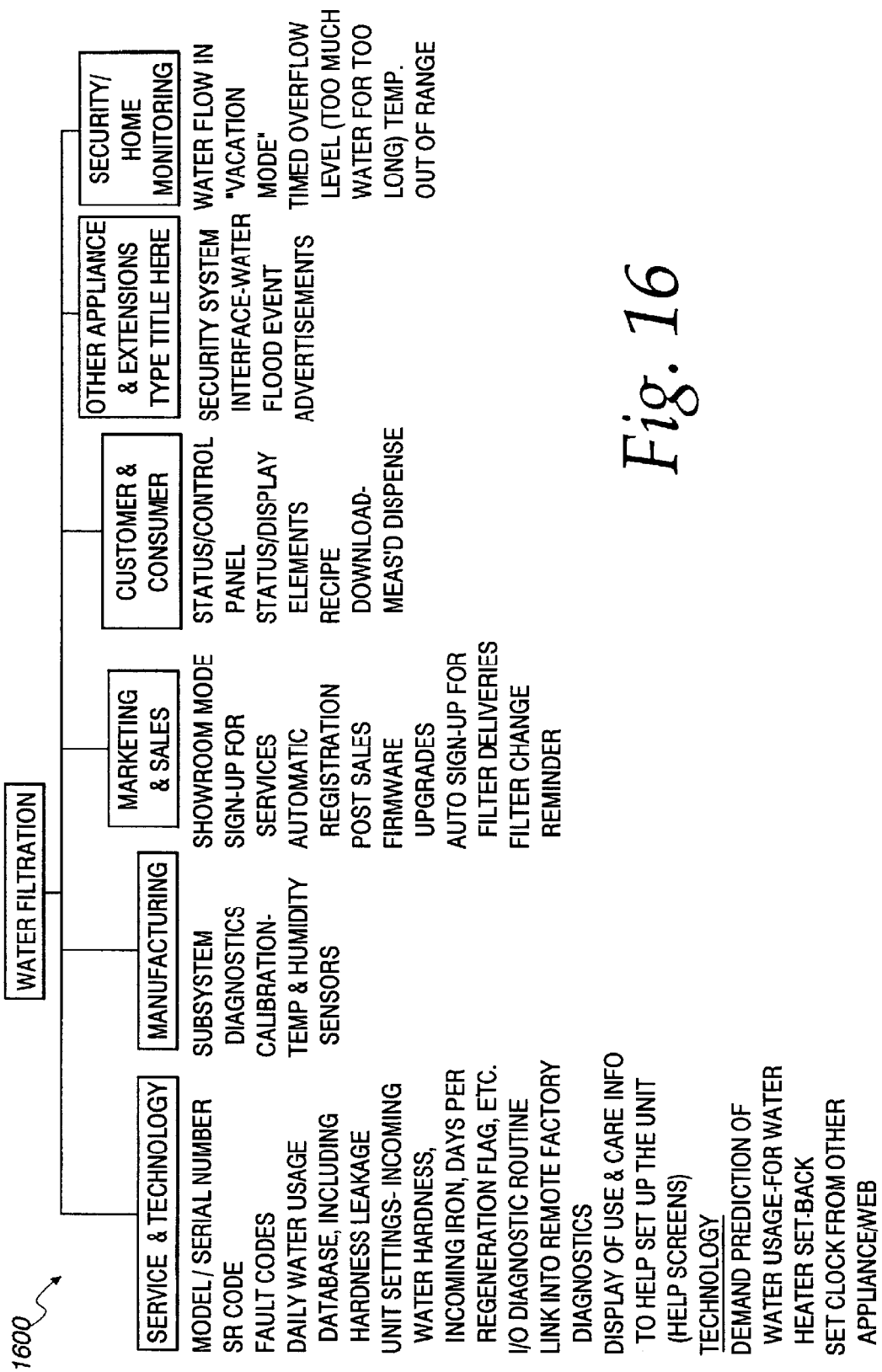
FIG. 16 illustrates a command structure for a water filter.
Figure 17:
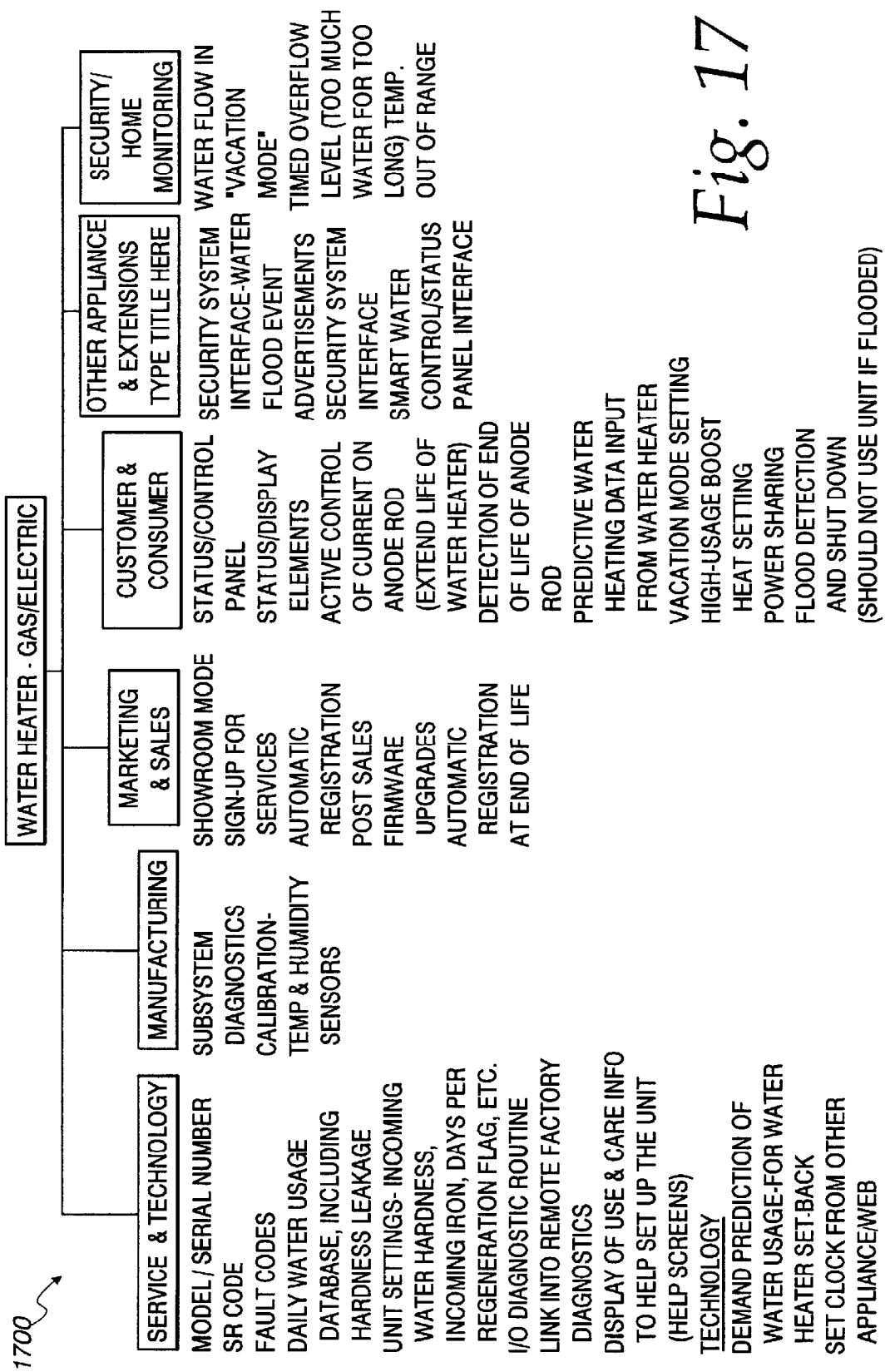
FIG. 17 depicts a command structure for a water heater.

Command structures may be defined for many different appliances. For example, FIG. 7 shows a command structure 700 for a dishwasher, FIG. 8 illustrates a command structure 800 for a home laundry washer, and FIG. 9 illustrates a command structure 900 for a home laundry dryer. FIG. 10 depicts a command structure 1000 for an Advantium™ microwave oven, FIG. 11 shows a command structure 1100 for a RAC (Room Air Conditioner, or a Zoneline™ unit (GE's tradename for Packaged Terminal Air Conditioners, the air conditioners typically used in motel and hotel rooms), and FIG. 12 illustrates a command structure 1200 for a range. FIG. 13 illustrates a command structure 1300 for a wall oven, FIG. 14 depicts a command structure 1400 for a range counter unit. FIG. 15 shows a command structure 1500 for a water softener, FIG. 16 illustrates a command structure 1600 for a water filter, and FIG. 17 depicts a command structure 1700 for a water heater.

Tables 1–24 below define exemplary Fields and functions for the User Communities defined for refrigerators, dishwashers, washers, dryers, microwave oven, RAC—Packaged Terminal Air Conditioner, range, wall oven, range, water softener, water filter, and water heater.

TABLE 1

User Community Service and Technology

| | Washer (Laundry) | Dryer (Laundry) | Dish-washer | Refrigerator |
|---|---|---|---|---|
| Model & Serial Number | x | x | X | x |
| Date, Time, Last Service Date | x | x | X | x |
| Setup Conditions | x | x | X | x |
| Environmental Conditions | x | x | X | x |
| Water Supply | x | | X | x |
| pressure | x | | X | x |
| hardness | x | | X | x |
| cleanliness (turbidity) | x | | X | x |
| Ambient Temperature and Humidity | x | x | X | x |
| Pollution | | | X | x |
| Venting situation | | x | | |
| Rain/Flood | | | X | x |
| Altitude | x | x | X | x |
| Pass Fail Diagnostics | x | x | X | x |
| Timer/Clock | x | x | X | x |
| Test of add-on modules (voice and barcode) | x | x | X | x |
| User Interface | x | x | X | x |
| Display | x | x | X | x |
| Input Devices | x | x | X | x |
| Sensors | x | x, moisture | x | x |
| Controller | x | x | x | x |
| RAM, ROM CRC | x | x | x | x |
| Output drivers (e.g., relay operation) | x | x | x | x |
| Heating Elements | | x | x | x |
| Motors | x | x | x | |
| Pump Motor & Auxiliary Pump | | | x | |
| Fill Valve | | | x | |
| pump | x | | | |
| water valves | x | | | |
| detergent dispenser | x | | | |
| Drain Solenoid | | | x | |

TABLE 1-continued

User Community Service and Technology

| | Washer (Laundry) | Dryer (Laundry) | Dish-washer | Refrigerator |
|---|---|---|---|---|
| Detergent/rinse aid dispense | | | x | |
| Detergent Inject | | | x | |
| Evaporation, condenser, crisper fans | | | | x |
| Compressor | | | | x |
| Evaporator | | | | x |
| Door Lock | x | x | x | x |
| Temperature Calibration | x | x | x | x |
| Communication System | x | x | x | x |
| F-Code Status | x | x | x | x |
| Abuse Condition (voltage, unapproved parts) | x | x | x | x |
| Remote Control Subsystem with feedback on action | x | x | | x |
| motor speed and direction | x | x | | |
| pump on/off | x | | | |
| hot/cold water valves | x | | | |
| detergent dispenser | x | | | |
| fill valve, pump (e.g., outlet pressure, float switch) | | | x | |
| drain valve (e.g., float switch) | | | x | |
| heating element (e.g., temperature sensor) | | x, on/off | x | |
| trip signature of safety devices | | | x | |
| water dispenser on/off | | | | x |
| ice dispenser on/off | | | | x |
| scan keys, read keys | x | x | x | x |
| trip signature of safety devices | x | x | | x |
| fresh food temperature setting | | | | x |
| freezer temperature setting | | | | x |
| fabric softener dispenser | | x | | |
| sealed system test cycle (e.g., on 10 minutes) | | | | x |
| add-on subsystem test (e.g., voice, barcode) | x | x | x | x |
| Routine Maintenance of perishable hardware items | | | | x |
| status of cleanliness | | | | x |
| water filter status check (number of gallons and time since last change) | | | | x |
| Wiring Information | | | x | x |
| Power outage information | x | x | x | x |
| Operation records (with time stamp) | x | x | | |
| Cycle Accountability | x | x | | |
| cycle duration | x | x | | |
| motor speed/direction | x | x | | |
| door open count & duration | x | x | | |
| fabric softener dispense | | x | | |
| hot/cold water | x | | | |

TABLE 1-continued

User Community Service and Technology

| | Washer (Laundry) | Dryer (Laundry) | Dishwasher | Refrigerator |
|---|---|---|---|---|
| dispenser pump on time | x | | | |
| Average Drying Times | | x | | |
| Software upgrades | x | x | | |
| Usage Profile (with time stamp) | | | x | x |
| cycle counts | | | x | x |
| cycle duration | | | x | x |
| door open count and duration | | | x | x |
| valve operation time | | | x | |
| pump operation time | | | x | |
| drain operation time | | | x | |
| ice maker, water dispenser | | | | x |
| food load estimate | | | | x |
| profile of remote actuation | x | x | x | x |
| user | x | x | x | x |
| manufacturer | x | x | x | x |
| event driven | x | x | x | x |
| Average soil level estimate | | | x | |
| Food type estimate | | | | x |
| Line Voltage History | x | x | x | x |

TABLE 2

User Community Manufacturing

| | Washer (Laundry) | Dryer (Laundry) | Dishwasher | Refrigerator |
|---|---|---|---|---|
| Subsystem Diagnostics | x | x | | x |
| compressor on/off and RPM | | | | x |
| fabric softener dispenser on/off | | x | | |
| fabric softener level | | x | | |
| air temperature sensor | | x | | |
| moisture sensor | | x | | |
| heating element on/off | | x | | |
| motor RPM, direction, winding temp | x | x | | |
| pump on/off current | x | | | |
| water valves on/off | x | | | |
| detergent dispenser on/off | x | | | |
| detergent level | x | | | |
| water temperature | x | | | |
| add-on option self test | x | | | |
| door interlock test | x | x | | |
| out-of-balance detector | x | | | |
| pump on/off and RPM | | | x | |
| heater element on/off, measure temperature, current | | | x | |
| blower on/off | | | x | |
| soil detectors | | | x | |
| defrost heater on/off, measure temperature, current | | | | x |
| fans(s) on/off and RPMs | | | | x |
| evaporator and condenser temperature | | | | x |
| refrigerant and air flow rates | | | | x |
| odor detectors | | | | x |
| water valve functions | | | x | x |
| control relay diagnostics | | | x | x |
| add-on options self test | | x | x | x |
| door interlock test | | x | x | x |
| histories of diagnostics for n days | x | x | x | x |
| Calibration - temperature sensors, motor torque | x | x, moisture | x, humidity | x, FF and FZ |
| Use and Care | x | x | x | x |
| initialization | x | x | x | x |
| date of manufacturer | x | x | x | x |
| serial number, model number, and sku number | x | x | x | x |
| revision code | x | x | x | x |
| option codes/ upgrade dates | x | x | x | x |
| Agency test/repair record | x | x | x | x |
| result of high pot, and the like. | x | | x | x |
| repair data | x | x | x | x |

TABLE 3

User Community Sales and Marketing

| | Washer (Laundry) | Dryer (Laundry) | Dishwasher | Refrigerator |
|---|---|---|---|---|
| Showroom mode | x | x | x | x |
| full functionality | x, without water | x, without heat | x, without water | x, without cooling |
| motor operation | x | x | | |
| door solenoid | x | x | | |
| pump on/off | x | | | |
| brake | x | | | |
| pump on & off (noise demo) | | | x | |
| control cycle settings | | | x | |
| system/compressor on/off | | | | x |
| door open/close | | | | x |
| quick chill drawer lights/fan | | | | x |
| temp settings (FF and FZ) | | | | x |
| demo communication with other appliances | x | x | x | x |
| remote notification via TV, PDA, cell phone and the like | x | x | x | x |
| functionality of add-on devices | x | x | x | x |
| barcode scanner | x | | x, detergent, rinse aid type | x, food content |
| child lockout function | x | x | x | x |
| remote lockout | x | x | x | x |

TABLE 3-continued

User Community Sales and Marketing

| | Washer (Laundry) | Dryer (Laundry) | Dishwasher | Refrigerator |
|---|---|---|---|---|
| remote read of appliance status | x | x | x | x |
| automatic registration | x | x | x | x |
| warranty | x | x | x | x |
| Sign-up for services | | | x | x |
| sign-up for automatic appliance consumable service: | | | x, detergent | x, water, odor, freshness filters |
| Post sales consumer reminder (e.g., for filters or detergent) | | | x | x |
| Advertisements | | | x | x |
| new add-ons | | | x | x |
| new features | | | x | x |
| co-branding | | | x | x |
| Firmware upgrades | x | x | x | x |
| new feature | x | x | x | x |
| integration of additional add-ons | x | x | x | x |
| security upgrade | x | x | x | x |
| support of additional communication mediums | x | x | x | x |
| additional event integration | x | x | x | x |

TABLE 4

User Community Customer and Consumer

| | Washer (Laundry) | Dryer (Laundry) | Dishwasher | Refrigerator |
|---|---|---|---|---|
| Standard Operation soil level select 1: | x | x | x | x |
| auto (soil level detect) | | | x | |
| saniwash | | | x | |
| pots and pans | | | x | |
| normal | | | x | |
| light | | | x | |
| china | | | x | |
| rinse only | | | x | |
| fresh food temperature | | | | x |
| freezer temperature | | | | x |
| run manual (set temp, speed) | | x | | |
| run auto | | x | | |
| cottons | | x | | |
| perm press | | x | | |
| delicates | | x | | |
| softener/anti-static dispense | | x | | |
| defrost cycle | | | | x |
| fill (hot, cold, warm) | x | | | |
| dispense detergent | x | | | |
| agitate, multi-speed | x | | | |
| drain | x | | | |
| spin, multi-speed | x | | | |
| timer operation | x | x | | |
| lockout of function | x | x | | x |
| Sabbath mode | | | | x |
| perishable food tracking (e.g., time tracking of meat, milk, eggs, and the like) | | | | x |
| delayed start | | | x | |

TABLE 4-continued

User Community Customer and Consumer

| | Washer (Laundry) | Dryer (Laundry) | Dishwasher | Refrigerator |
|---|---|---|---|---|
| start with door interlock check-Options | | | x | |
| hi temp rinse | | | x | |
| hi temp wash | | | x | |
| heated dry | | | x | |
| Extended Operation | | | x | x |
| re-calibration | | | x | x |
| self diagnosis and status | | | x | x |
| use of upgraded firmware | | | x | x |
| use of passive/ active event triggers | | | | x |
| multilingual | | | | x |
| Remote Operation | x | x | x | x |
| download new firmware | x | x | x | x |
| trigger of events | x | x | x | x |
| signal message to TV | x | x | x | x |
| activate display upon entering room | x | x | x | x |
| notification of power failure | x | x | x | x |
| remote status request | x | x | x | x |
| remote shutdown | x | x | x | x |
| remote lockout | x | x | | x |
| remote request for service | x | x | x | x |
| remote alarm trigger if armed | x | x | x | x |
| multilingual | x | x | x | x |
| Service | x | x | x | x |
| service request based on status | x | x | x | x |
| replacement of consumable items | x | x | x | x |
| link into remote factory diagnostics | x | x | x | x |
| operations of add-ons being enabled | x | x | x | x |
| barcode scanner upgrade | x | x | x | x |
| link into kitchen helper | x | x | x | x |
| display use and care instructions | x | x | x | x |
| pay-by-use feature | x | x | x | x |
| reminders | x | x | x | x |
| recalibration | x | x | x | x |
| use optimization | x | x | x | x |
| adjustments due to use profile | x | x | x | x |
| Customer (fleet operator) | x | x | x | x |
| usage profiles | x | x | x | x |
| cycle profiles | x | x | x | x |
| wear patterns | | | x | x |
| abuse attempts and notifications | x | x | x | x |
| remote shutdown based on event | x | x | x | x |
| remote temperature settings (FF and FZ) | | | | x |
| performance monitor | | | x | |
| peak energy management | x | x | x | x |
| condenser cleanliness monitor | | | | x |
| low compressor run watts (leakage) | | | | x |
| high compressor run | | | | x |

TABLE 4-continued

User Community Customer and Consumer

| | Washer (Laundry) | Dryer (Laundry) | Dish-washer | Refrigerator |
|---|---|---|---|---|
| watts (restriction) | | | | |
| Commercial | x | x | | |
| operation records | x | x | | |
| remote diagnostics | x | x | | |
| service | x | x | | |
| central fee collection | x | x | | |
| online price changes by time of day, promotion, and the like | x | x | | |
| statistical data collection | x | x | | |
| all smart card operations | x | x | | |

TABLE 5

User Community Appliances & Extensions

| | Washer (Laundry) | Dryer (Laundry) | Dish-washer | Refrigerator |
|---|---|---|---|---|
| Events | | | x | x |
| remote notification | | | x | x |
| fault notification | | | x | x |
| end of cycle | | | x | |
| end of quick chill cycle | | | | x |
| power sharing notification | | | x | x |
| internal to appliance | | | x | x |
| to other appliances | | | x | x |
| from other appliances | | | x | x |
| power line fault notification | | | x | x |
| outage, under/over voltage, frequency, quality | | | x | x |
| remote setting | | | x | x |
| soil level | | | x | |
| options | | | x | |
| delayed start | | | x | |
| FF temperature | | | | x |
| FZ temperature | | | | x |
| quick chill on/off | | | | x |
| Add-ons (e.g., barcode scanner, scale, magnetic strip smart card reader for additional recipes and ability to link into home helper, microphone) | | | x | x |
| message passing | | | x | x |
| recognition of add-on | | | x | x |
| pass information to API | | | x | x |
| receive request for information from API | | | x | x |
| scan | | | x | x |
| software revision | | | x | x |
| bar code firmware upgrade | | | x | x |
| fault code alert | | | x | x |
| Save user configurable setting when power is interrupted | | | x | x |

TABLE 6

User Community Security & Home Monitoring

| | Washer (Laundry) | Dryer (Laundry) | Dishwasher | Refrigerator |
|---|---|---|---|---|
| Door opening | | | x | x |
| Water on too long without float switch activation | | | x | |
| Temperature not in regulation | | | x | |
| Ice/Water dispense | | | | x |
| Door open too long | | | | x |

TABLE 7

User Community Service and Technology

| | Water Softener | Water Heater |
|---|---|---|
| Model & Serial Number | x | |
| Date, Time, last service date | | |
| Control Software version number | | |
| SR Code | x | |
| Fault Codes | x | |
| Daily water usage database, including hardness leakage | x | |
| Unit settings, incoming water hardness, incoming iron, days per regeneration flag | x | |
| I/O diagnostic routines | x | |
| turbine input | x | |
| clock motor on/off | x | |
| keypad | x | |
| display | x | |
| salt level sensor | x | |
| Link into remote factory diagnostics | x | |
| Display of use and care info to help setup | x | |
| Demand prediction of water usage, for water heater set-back | x | |
| Set clock from other appliance or Internet | x | |
| Active Control of current on anode rod to extend life of water heater | | x |
| switching to one of several resistor values based on water conductivity | | x |
| auto switch to soft water resistor setting if softener is installed | | x |
| Detection of end of life of anode rod | | x |
| Predictive water heating data input from water heater | | x |
| hot water orders placed by clothes washer, dishwasher (immediate and delayed start), to optimize heating cycle, delay to power share or push to off-peak | | x |

TABLE 7-continued

User Community Service and Technology

| | Water Softener | Water Heater |
|---|---|---|
| hour usage | | |
| Vacation mode setting | | x |
| High usage boost heat setting | | x |
| Power sharing | | x |
| Flood detection and shut down | | x |

TABLE 8

User Community Manufacturing

| | Water Softener |
|---|---|
| Subsystem Diagnostics | x |
| clock motor | x |
| clock | x |
| display | x |
| power-off memory | x |
| annunciator | x |
| programming | x |
| keypad | x |
| turbine | x |
| salt level sensor | x |
| Calibration | x |
| salt level sensor | x |
| Use and Care | x |
| initialization | x |
| date of manufacturer | x |
| serial number, model number, and sku number | x |
| revision code | x |
| option codes/ upgrade dates | x |
| repair data | x |

TABLE 9

User Community Sales and Marketing

| | Water Softener | Water Heater |
|---|---|---|
| Showroom mode | x | |
| demo communication to other appliances | x | |
| demo water circuit breaker operation | x | |
| demo programming mode | x | |
| demo display of water usage, average gallons/day, flow rate, average salt efficiency/rise water efficiency. | x | |
| Automatic registration | x | x |
| warranty | x | |
| Sign-up for services | x | |
| sign-up for automatic appliance consumable service (e.g., salt or "Iron Out") | x | |
| Post Sales | x | |
| Firmware upgrades | x | |

TABLE 9-continued

User Community Sales and Marketing

| | Water Softener | Water Heater |
|---|---|---|
| new features (e.g., salt efficiency algorithms) | x | |
| bug corrections | x | |
| support for other communication mediums | x | |
| Post sales | x | |
| consumer reminder (e.g., for salt or iron out) | x | |
| At end of life | | |
| Advertise | | x |
| Repurchase | | x |

TABLE 10

User Community Customer and Consumer

| | Water Softener |
|---|---|
| Status/Control panel | x |
| on unit | x |
| on TV | x |
| on wall-mounted water products status/control panel | x |
| Status/display elements | x |
| display how much salt is left in unit | x |
| salt low signal | x |
| auto order salt | x |
| flood detection signal | x |
| remote control of water shut-off valve | x |
| self-diagnostics | x |
| multilingual | x |
| notification of power out | x |

TABLE 11

User Community Appliances & Extensions

| | Water Softener | Water Heater |
|---|---|---|
| Security system interface - water flood event | x | x, water leak on water heater |
| water circuit breaker | x | |
| Advertisements | x | |
| new add-ons | x | |
| new features | x | |
| co-branding | x | |
| Smart Water Control/status panel interface | | x |
| vacation mode setting | | x |

TABLE 12

User Community Security & Home Monitoring

|  | Water Softener |
|---|---|
| Water flow in vacation mode | x |
| Timed overflow level (too much water for too long) | x |
| Temperature out of control | x |

Water filtration products and water heaters have commands similar to those of the other water products (e.g., the water softener) except that the Customer & Consumer User Community includes recipe download commands that determine amounts of cold, hot, or tap water to dispense, as measured in tablespoon, cups, quarts and the like). In addition, the Sales & Marketing User Community instructions include automatically signing up for water filter deliveries and filter change reminders.

TABLE 13

User Community Service and Technology

|  | Wall Oven | Speedcook, SI/DI, Free standing | Advantium ™ Microwave | Counter unit |
|---|---|---|---|---|
| Model & Serial Number | x | x | x | x |
| Date, Time, Last Service Date | x | x | x | x |
| Control software version number |  |  | x |  |
| Setup Conditions | x | x |  | x |
| environmental conditions | x | x | x | x |
| balance/levelness | x | x |  | x |
| humidity | x | x | x, current, min, max | x |
| power (voltage, current) | x | x | x, line voltage downstream from fuse, line current | x |
| AC line connection (L1, N, Gnd) |  |  | x |  |
| ambient temperature | x | x | x, current, min, max | x |
| altitude | x | x | x | x |
| Machine status |  |  | x |  |
| interlock upper (closed/open) |  |  | x |  |
| interlock lower (closed/open) |  |  | x |  |
| door status (open/closed) |  |  | x |  |
| turntable status (on/off) |  |  | x |  |
| model I.D. (keytail) |  |  | x |  |
| F-code status (last, history) |  |  | x |  |
| Pass Fail Diagnostics | x | x | x | x |
| clock |  | x |  | x |
| detect failed light bulb | x | x | x | x, and radiant elements (e.g., LEDs) |
| relay driver |  |  | x |  |
| lamps - optical |  |  | x |  |
| cooling fans (current or TC) |  |  | x |  |
| stirrer motor (RF) |  |  | x |  |
| HVT secondary (current) |  |  | x |  |
| oven temperature calibration (RTD) |  |  | x |  |
| test of add-on modules (e.g., voice, bar code) | x | x |  |  |
| user interface | x | x |  | x |
| display | x | x |  | x |
| input devices | x | x |  | x |
| controller | x | x | x | x |
| RAM, ROM CRC | x | x | x | x |
| output drivers | x | x | x, e.g., relay driver | x |
| heating elements | x | x | x |  |
| lamps - optical |  |  | x | x, radiant elements |
| cooling fans (current or TC) |  |  | x |  |
| oven temperature calibration (RTD) |  |  | x |  |
| detect faulty light bulb |  |  | x |  |
| stirrer motor (RF) |  |  | x |  |
| HVT secondary (current) |  |  | x |  |
| convection fan | x | x |  |  |
| door lock | x | x |  |  |
| temperature calibration | x | x |  | x |
| communication system | x | x |  | x |
| F-code status | x | x |  | x |
| Abuse Condition (voltage, unapproved parts) | x | x |  | x |
| Wiring Information | x | x (e.g., polarity) |  | x |
| Remote control commands |  | x |  | x |
| report environment |  | x |  |  |
| report display/beep |  | x |  |  |
| remote program feature |  | x |  |  |
| report humidity sensor |  | x |  |  |
| report thermal sensor |  | x |  |  |
| report keys |  | x |  |  |
| report power |  | x |  |  |
| local beep signal |  | x |  |  |
| add-on subsystem (e.g., voice, barcode, and the like) |  | x |  |  |
| report internal command |  | x |  |  |
| local message (e.g., "Please Wait") |  | x |  |  |
| Power Outage Information | x | x |  | x |
| Remote control subsystem with feedback on action | x | x |  | x |
| turn heater on/off, read temperature | x | x |  | x |
| turn fan on/off, read temperature | x | x |  | x |
| scan keys, read keys | x | x |  | x |
| trip signature of safety devices | x | x |  | x |
| pre-heat |  | x |  |  |
| gas ignition system | x | x |  |  |

TABLE 13-continued

User Community Service and Technology

| | Wall Oven | Speedcook, SI/DI, Free standing | Advantium ™ Microwave | Counter unit |
|---|---|---|---|---|
| check pan size, type, presence | x | x | | x |
| circuit check | x | | | |
| buzzer test | x | x | | x |
| add-on subsystem test (e.g., voice barcode) | x | x | | x |
| Routine Maintenance of hardware perishable items | x | x | x | |
| charcoal filter | | | x | |
| status of cleanliness | x | x | | |
| self clean filter status check | x | x | | |
| Usage Profile (with time stamp) | x | x | | x |
| cycle accountability | x | x | | x |
| cycle duration | x | x | | x |
| burner usage count | | | | x |
| door open count | x | x | | |
| food load estimate | x | x | | x |
| profile of remote actuation | x | x | | x |
| user | x | x | | x |
| manufacturer | x | x | | x |
| event driven | x | x | | x |
| Food type estimate | x | x | | x |
| Feature "play" meter | | | x | |
| Power level "play" meter | | | x | |
| Magnetron accumulated on-time | | | x | |
| Power Cycle count | | | x | |
| HVT | | | x | |
| Convection heater | | | x | |
| Halogen lamps | | | x | |
| Door open/close count | | | x | |

TABLE 14

User Community Manufacturing

| | Wall Oven | Speedcook, SI/DI, free standing | Advantium ™ Microwave | Counter unit |
|---|---|---|---|---|
| Subsystem diagnostics | x | x | x | x |
| heater on/off, measure temperature, current, and gas flow | x | x | | x |
| halogen lamp on/off | | | x | |
| fan on/off | x | x | x | |
| magnetron check | | x | x, temp, current | |
| clock, control, relay diagnostics | x | x | x | x |
| add-on options self test | x | x | x | x |
| door interlock test | x | x | x | |
| Calibration | x | x | x | x |
| sensors (e.g., temperature, bake, broil elements) | x | x | x, light, humidity | x |
| features, including pan size detect | x | x | | x |
| Use & Care | x | x | x | x |
| initialization | x | x | x | x |
| date of manufacturer | x | x | x | x |

TABLE 14-continued

User Community Manufacturing

| | Wall Oven | Speedcook, SI/DI, free standing | Advantium ™ Microwave | Counter unit |
|---|---|---|---|---|
| serial number, model number, sku number | x | x | x | x |
| revision code | x | x | x | x |
| option codes, upgrade dates | x | x | x | x |
| Agency test/repair record | x | x | x | x |
| results of high pot | x | x | x | x |
| repair data | x | x | x | x |

TABLE 15

User Community Sales and Marketing

| | Wall Oven | Speedcook, SI/DI, free-standing | Advantium ™ Microwave | Counter unit |
|---|---|---|---|---|
| Showroom mode | x | x | x | x |
| full functionality | x, without element activation | x | x, without thermal/RF | x, without element activation |
| bake on/off | x | x | | |
| broil on/off | x | x | | |
| time delay | x | x | | x |
| temperature set | x | x | | x |
| recipe download | x | x | x | x |
| demo communication with other appliances | x | x | x | x |
| remote notification through TV, palm pilot, cell phone, beeper of cooking completion | x | x | x | x |
| set clock from other appliance | x | x | x | x |
| functionality of add-on devices | x | x | x | x |
| barcode scanner, recipe | x | x | x | x |
| child lockout function | x | x | | x |
| remote lockout | x | x | x | x |
| remote read of appliance status | x | x | x | x |
| automatic registration | x | x | x | x |
| warranty | x | x | x | x |
| Sign-up for services | x | x | x | x |
| monthly recipe | x | x | | x |
| sign-up for automatic appliance consumable service | x | x | x | x |
| Post Sales consumer reminder, for example, for filters | x | x | x | x |
| Advertisements | x | x | x | x |
| new add-ons | x | x | x | x |
| new features | x | x | x | x |
| co-branding | x | x | x | x |
| Firmware Upgrades | x | x | x | x |
| new recipe | x | x | x | x |
| new feature | x | x | x | x |
| integration of additional add-ons | x | x | x | x |
| bug correction | x | x | x | x |
| security upgrade | x | x | x | x |
| support of other | x | x | x | x |

TABLE 15-continued

User Community Sales and Marketing

|  | Wall Oven | Speedcook, SI/DI, free-standing | Advantium ™ Microwave | Counter unit |
|---|---|---|---|---|
| communication mediums |  |  |  |  |
| additional event integration | x | x | x | x |

TABLE 16

User Community Customer and Consumer

|  | Wall Oven | Speedcook, SI/DI, free standing | Advantium ™ Microwave | Counter unit |
|---|---|---|---|---|
| Standard Operation | x | x |  | x |
| bake | x | x |  |  |
| broil | x | x |  |  |
| speedbake, speedbroil |  | x |  |  |
| selfclean | x | x |  |  |
| proofing | x | x |  |  |
| dehydration | x | x |  |  |
| cook and hold, may also specify minimum temperature, e.g., 170° F. | x, |  |  |  |
| self-clean and timed self-clean |  | x |  |  |
| Delay start, cook and hold (minimum temperature) |  |  |  | x |
| timed and non-timed operation | x | x |  | x |
| set clock, kitchen timer | x | x |  | x |
| favorite recipe | x | x |  | x |
| lockout of function | x | x |  | x |
| 24 hour override | x | x |  | x |
| Sabbath mode | x | x |  | x |
| surface unit |  | x |  | x |
| power regulation |  | x |  | x |
| boil detect, boil dry detect, pan presence detect |  | x |  | x |
| pansize detect |  | x |  | x, and pan presence |
| Extended operation | x | x | x | x |
| re-calibration | x | x | x | x |
| self diagnostics and status | x | x | x | x |
| use of upgraded firmware | x | x | x | x |
| use of downloaded recipes | x | x | x | x |
| use of passive or active event triggers | x | x | x | x |
| multilingual instructions | x | x | x | x |
| Remote operation | x | x | x | x |
| download | x | x | x | x |
| new recipe | x | x | x | x |
| new firmware | x | x | x | x |
| trigger of events | x | x | x | x |
| signal message to TV or other device that preheat is done | x | x | x | x |
| activate display upon person entering room | x | x | x | x |

TABLE 16-continued

User Community Customer and Consumer

|  | Wall Oven | Speedcook, SI/DI, free standing | Advantium ™ Microwave | Counter unit |
|---|---|---|---|---|
| receive latest clock information | x | x | x | x |
| notification of power failure | x | x | x | x |
| remote status request | x | x | x | x |
| remote shutdown | x | x | x | x |
| remote lockout | x |  | x | x |
| remote request for service | x | x | x | x |
| remote alarm trigger if armed | x | x | x | x |
| multilingual | x | x | x | x |
| Service | x | x | x | x |
| service request based on status | x | x | x | x |
| replacement of consumable items | x | x | x | x |
| link into remote factory diagnostics | x | x | x | x |
| operations of add-ons being enabled | x | x | x | x |
| barcode scanner upgrade | x | x | x | x |
| link into kitchen helper | x | x | x | x |
| display use and care | x | x | x | x |
| pay-by-use feature | x | x | x | x |
| reminders | x | x | x |  |
| Self Clean | x | x |  | x |
| Recalibration | x | x |  | x |
| Use Optimization | x | x |  | x |
| Adjustments for altitude | x | x |  | x |
| Adjustments due to use profile | x | x |  | x |
| Save setting when power fails |  | x |  | x |
| Customer (fleet operator) | x | x |  | x |
| usage profiles | x | x |  | x |
| cycle profiles | x | x |  | x |
| wear patterns | x | x |  | x |
| abuse attempts and notification | x | x |  | x |
| remote shutdown based on events | x | x |  | x |
| remote enable | x | x |  | x |
| time of day/special pricing | x | x |  | x |
| coin box accountability |  |  |  | x |

TABLE 17

User Community Appliances & Extensions

|  | Wall Oven | Speedcook, SI/DI, Free standing | Advantium ™ Microwave | Counter Unit |
|---|---|---|---|---|
| Events | x | x | x | x |
| remote notification | x | x | x | x |
| fault notification | x | x | x | x |
| end of cycle | x | x | x | x |
| power sharing notification |  |  |  |  |
| internal to appliance | x | x | x | x |
| to other appliances | x | x | x | x |
| from other appliances | x | x | x | x |

TABLE 17-continued

User Community Appliances & Extensions

| | Wall Oven | Speedcook, SI/DI, Free standing | Advantium ™ Microwave | Counter Unit |
|---|---|---|---|---|
| power line fault notifications | x | x | x | x |
| outage, under, over, frequency, quality | x | x | x | x |
| gas pressure | x | x | | x |
| remote setting | x | x | x | x |
| clock | x | x | x | x |
| Add-ons (e.g., barcode scanner, scale, magnetic strip smart card reader for additional recipes and ability to link into "home helper". | x | x | x | x |
| message passing | x | x | x | x |
| recognition of add-on | x | x | x | x |
| pass information to API | x | | x | x |
| receive request for information from API | x | x | x | x |
| scan | x | x | x | x |
| software revision | x | x | x | x |
| bar code firmware upgrade | x | x | x | x |
| fault code alert | x | x | x | x |
| save user configurable setting when power is interrupted | x | x | | x |

TABLE 18

User Community Security & Home Monitoring

| | Wall Oven | Speedcook, SI/DI, Free standing | Advantium ™ Microwave | Counter Unit |
|---|---|---|---|---|
| Temperature too high - door or surface | x | x | | x |
| Door opening | x | x | x | |
| Cooking elements left on | x | x | x, magnetron or lights | x |
| Flame/smoke detect | | | x | |

TABLE 19

User Community Service and Technology

| | RAC/ Zoneline/ Built in |
|---|---|
| Model & Serial Number | x |
| Date, Time, Last Service Date | x |
| Control software version number | x |
| Setup Conditions | x |
| environmental conditions | x |
| temperatures | x |
| indoor coil (refrigerant) | x |
| outdoor coil (refrigerant) | x |
| indoor air | x |
| outdoor air | x |
| setpoint | x |
| pressures | x |
| indoor coil (refrigerant) | x |
| outdoor coil (refrigerant) | x |
| compressor suction (refrigerant) | x |
| compressor discharge (refrigerant) | x |
| humidity | x |
| indoor humidity | x |
| outdoor humidity | x |
| altitude | x |
| incoming line voltage | x |
| incoming line current | x |
| AC line connection (L1, N, Gnd) | x |
| Power outage history | x |
| Machine Status | x |
| compressor data | x |
| run hours | x |
| number of starts | x |
| current | x |
| voltage | x |
| indoor fan data | x |
| run hours | x |
| current | x |
| voltage | x |
| motor temperature | x |
| outdoor fan data | x |
| run hours | x |
| current | x |
| voltage | x |
| motor temperature | x |
| fault code status (last/history) | x |
| outdoor air intake status | x |
| heater element status | x |
| temperature | x |
| current | x |
| voltage | x |
| heater safety status (open/closed) | x |
| dip switch status (up/down) | x |
| remote mode status | x |
| Pass fail diagnostics | x |
| controller self test | x |
| RAM test/ROM checksum | x |
| relay driver | x |
| heating elements (current) | x |
| evaporator fans (current or TC) | x |
| condenser fans (current or TC) | x |
| compressor (voltage/current) | x |
| Remote control commands | x |
| report environment | x |
| report equipment status | x |
| report humidity sensors | x |
| report thermal sensors | x |

TABLE 19-continued

User Community Service and Technology

| | RAC/Zoneline/Built in |
|---|---|
| report remote COMM connection | x |
| report power | x |
| report internal command | x |
| local message (e.g., "Please wait") | x |
| local beep signal | x |
| add-on subsystem (e.g., voice, barcode) | x |
| Routine Maintenance of serviceable items | x |
| air filter status | x |
| refrigerant filter status | x |
| refrigerant status | x |
| Comm protocol compatibility | x |

TABLE 20

User Community Manufacturing

| Subsystem diagnostics | RAC/Zoneline/Built in |
|---|---|
| sealed system (compressor), measure temperature | x |
| heating elements | x |
| motors, fans/blowers | x |
| communication system | x |
| Calibration | x |
| temperature sensors (indoor, outdoor, coil) | x |
| humidity sensors (indoor, outdoor) | x |
| altitude sensor | x |
| Use and Care | x |
| initialization | x |
| date of manufacture | x |
| serial number, model number, sku number | x |
| revision code | x |
| option codes/upgrade dates | x |
| Agency test/repair record | x |
| results of high pot | x |
| repair data | x |

TABLE 21

User Community Sales and Marketing

| | RAC/Zoneline/Built in |
|---|---|
| Showroom mode | x |
| full functionality | x, without thermal/RF activation |
| demo communication with other appliances | x |
| remote notification | x |

TABLE 21-continued

User Community Sales and Marketing

| | RAC/Zoneline/Built in |
|---|---|
| through TV, palm pilot, cell phone, beeper of cooking completion | |
| functionality of add-on devices | x |
| remote lockout | x |
| remote read of appliance status | x |
| automatic registration | x |
| warranty | x |
| Sign-up for services | x |
| warranty | x |
| service contract | x |
| sign-up for automatic appliance consumable service | x |
| Post Sales | x |
| consumer reminder, for example, for filters | x |
| warranty | x |
| service contract | x |
| Advertisements | x |
| new add-ons | x |
| new features | x |
| co-branding | x |
| Firmware Upgrades | x |
| new feature | x |
| integration of additional add-ons | x |
| bug correction | x |
| security upgrade | x |
| support of other communication mediums | x |
| additional event integration | x |

TABLE 22

User Community Customer and Consumer

| | RAC/Zoneline/Built in |
|---|---|
| Extended operation | x |
| re-calibration | x |
| self diagnostics and status | x |
| use of upgraded firmware | x |
| use of downloaded recipes | x |
| use of passive or active event triggers | x |
| multilingual instructions | x |
| Remote operation | x |
| download | x |
| new recipe | x |
| new firmware | x |
| trigger of events | x |
| signal message to TV or other device that preheat is done | x |
| activate display upon person entering room | x |
| receive latest clock | x |

TABLE 22-continued

User Community Customer and Consumer

| | RAC/Zoneline/Built in |
|---|---|
| information notification of power failure | x |
| remote status request | x |
| remote shutdown | x |
| remote lockout | x |
| remote request for service | x |
| remote alarm trigger if armed | x |
| multilingual | x |
| Service | x |
| service request based on status | x |
| replacement of consumable items | x |
| link into remote factory diagnostics | x |
| operations of add-ons being enabled | x |
| barcode scanner upgrade | s |
| link into kitchen helper | x |
| display use and care | x |
| pay-by-use feature | x |
| reminders | x |

TABLE 23

User Community Appliances & Extensions

| | RAC/Zoneline/Built ins |
|---|---|
| Events | x |
| remote notification | x |
| fault notification | x |
| power sharing notification | x |
| internal to appliance | x |
| to other appliance/equipment/BAS controls | x |
| from other appliances/equipment/BAS Controls | x |
| power line fault notifications | x |
| outage, under, over, frequency | x |
| remote setting | x |
| clock | x |
| energy management | x |
| cycle (heating/cooling) | x |
| setpoint temperature | x |
| Add ons, e.g., barcode scanner, scale, magnetic strip smart card reader for EMS programming and ability to link into "home helper" | x |
| message passing | x |
| recognition of add-on | x |
| pass information to API | x |

TABLE 23-continued

User Community Appliances & Extensions

| | RAC/Zoneline/Built ins |
|---|---|
| receive request for information from API | x |
| scan | x |
| software revision | x |
| bar code firmware upgrade | x |
| fault code alert | x |

TABLE 24

User Community Security & Home Monitoring

| | RAC/Zoneline/Built ins |
|---|---|
| Temperature out of range | x |
| Motion Sensor | x |

The User Community contexts may be the subject of context switches, as explained above. Thus, turning to FIG. 18, for example, an example of a service individual requesting Service and Technology access is presented. An appliance network 1802 is assumed, with the ACCs 1804, 1806, 1808 connected to the appliances 1810 and 1812, and external network 1814 through the API 1816 (i.e., an Application Programming Interface) as shown. Initially, the API 1816 presents a Authentication message 1818 with 1024 byte encryption (as an example) for Local Service for the appliance 1810. The ACC 1806 responds with the Services Authenticated message 1820. Subsequently, the service individual, through the ACC 1804, issues Service commands 1822 and 1824 (and others, as desired) to the appliance 1810. Subsequently, when the service individual is finished, the ACC 1804 sends a Release Authentication message 1826 to the ACC 1806. The ACC 1806 responds with a Authentication Released message 1828.

As another example, assume that an oven is currently operating in a default user setting of Bake 375. A request broadcast from a web source to a gateway may arrive with a request to upgrade firmware in the oven. The API on the gateway stores a list of applicable appliances in the local appliance network. The API proceeds to buffer the new firmware, validates the content, and acknowledges receipt. The API then requests a context switch on the oven for Sales and Marketing context (for firmware upgrades). In response, the oven confirms the context switch to the API (e.g., as explained above using encrypted command frames).

Subsequently, the API sends an initialization packet followed by a packetized data stream for the firmware. The ACC connected to the appliance acknowledges the packets and sends retransmission requests as required (e.g., due to lost or corrupted packets). The ACC may also compute an overall CRC and request API authentication. Upon receiving a responsive authentication from the API, the ACC may then request a context switch back to Consumer mode.

As shown above in FIG. 1, for example, ACCs provide the communication interface to the appliances 102–108. Turning now to FIG. 19, that figure illustrates an exemplary implementation of an ACC 1900. The ACC 1900 includes a communication controller CPU 1902, modulator 1904, and physical layer transceiver 1906. In addition, the ACC 1900 includes several types of memory including a boot ROM 1902, flash memories 1908 and 1910, and pointer memory (e.g., RAM) 1912 and 1913, and a boot ROM 1914. A standard command interpreter 1916 and an extended command interpreter 1918 are provided to handle standard function calls (e.g., on, off, normal wash, and the like), while the extended command interpreter 1918 handles additional functions for customized operations (e.g., extended wash, double rinse, and the like). Encryption authentication is provided through the encryption hardware and or software 1920. The modulator 1904 provides an interface for power line carrier, infra red, Ethernet, or other forms of communication interfaces.

Note that additional CPUs may be provided to specifically handle certain functions. Thus, an upgrade CPU 1922 may be later installed for faster or expanded functionality, a carrier CPU 1924 may be provided for optimized physical layer implementation of a power line or wireless network, and a communication CPU 1926 may be provided for performing the necessary data link and application layer functions of the chosen communication network. In particular, the communication CPU 1926 may interact with the communication control circuitry 1928 (which provides, for example, a serial interface (e.g., RS 232, GEA communication bus, and the like) to an appliance). In addition, Main Control Function circuitry 1930 is provided for performing the bridging between the external communication network (power line, wireless, etc.) and the internal GEA bus, as well as any additional feature content being provided by the ACC, such as downloadable, reprogrammable firmware capability, real time clock implementation, additional sensors (i.e. ambient temperature, humidity, etc.), or other I/O which may be desirable for a connected appliance but which is not normally present in the unconnected appliance.

Figure 20:
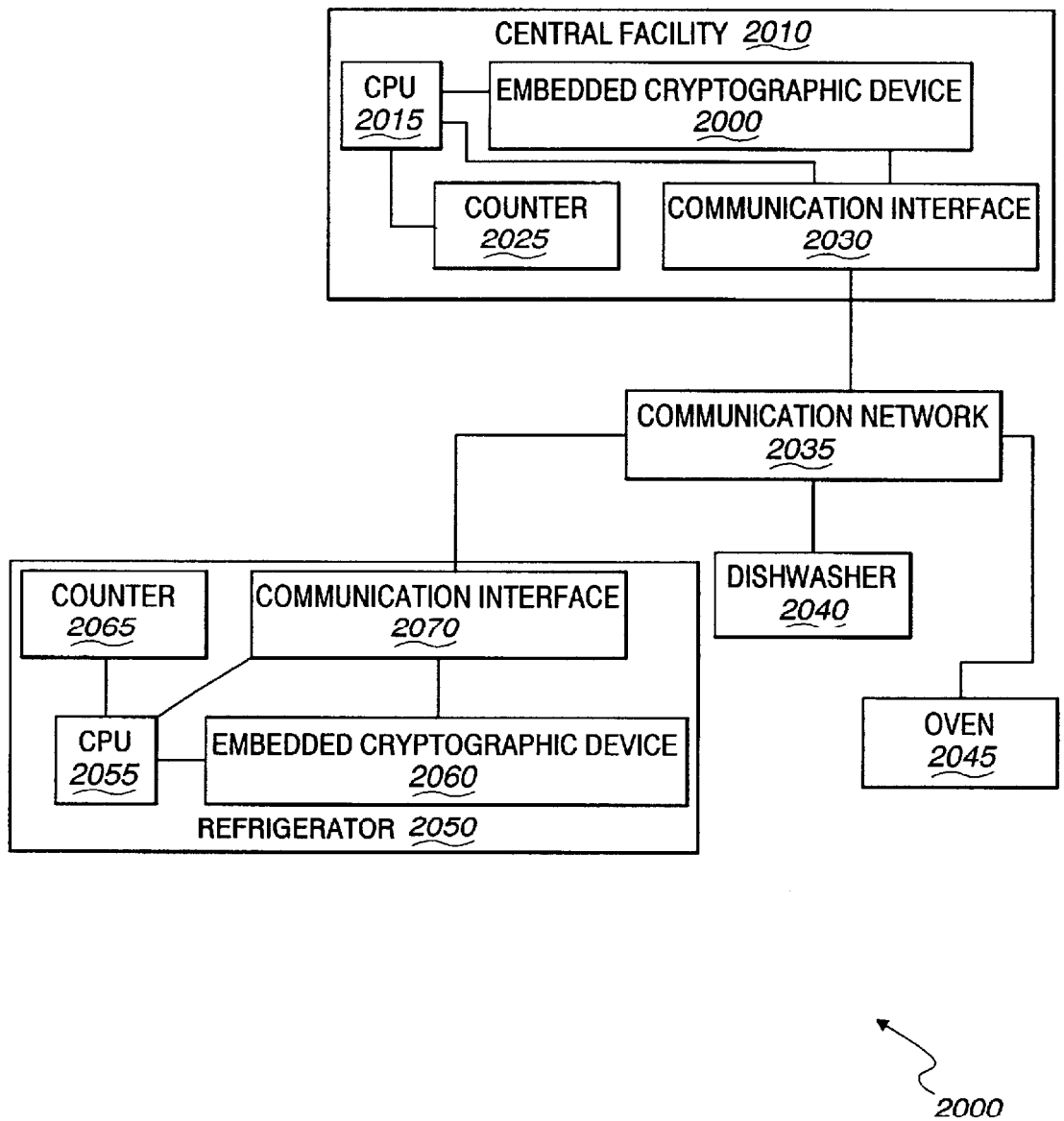
FIG. 20 illustrates a system for remote appliance monitoring, control, and diagnosis using an Embedded Cryptographic Device (ECD).

FIG. 20 illustrates an exemplary system 2000 for remote appliance monitoring, control, and diagnosis using an Embedded Cryptographic Device (ECD) for message authentication. The system 2000 includes a central facility 2010, a communication network 2035, and home appliances such as a refrigerator 2050, a dishwasher 2040, and an oven 2045, for example.

The central facility 2010 preferably includes a CPU 2015, a counter 2025, an Embedded Cryptographic Device (ECD) 2020, and a communication interface 2030. The counter 2025 provides, as an example, register or other memory space in which the CPU 2015 may maintain counters as explained below. The counter 2025 need not be a separate memory. Rather, the counter 2025 may be included in the ECD 2020, for example. The ECD 2020 preferably stores an algorithm used to authenticate data it receives from an appliance such as the refrigerator 2050. To that end, the ECD 2020 may include program and data memory from which the CPU 2015 executes the cryptographic algorithm, or may include a dedicated CPU, program memory, and data memory with which to process the cryptographic algorithm and share results with the CPU 2015. The CPU 2020 is preferably linked to a communication interface 2030 that connects the central facility 2010 to a communication network 2035 using, for example, a network interface card, cable modem, dial up connection, or the like. The communication network 2035 may be, for example, the Internet, and the communication interface 2030 preferably communicates with the communication network 2035 using the TCP/IP protocol.

As mentioned above, the system 2000 also includes home appliances such as a refrigerator 2050, a dishwasher 2040, and an oven 2045, as examples. The refrigerator 2050 preferably includes a CPU 2055, a counter 2065, an ECD 2060, and a communication interface 2070. As noted above, the counter 2065 may be part of the ECD 2060, and the ECD 2060 may provide program and data memory to the CPU 2055, or may implement a CPU, program memory and data memory dedicated to cryptographic processing. The CPU 2055 is linked to a communication interface 2070 that connects the refrigerator 2050 to the communication network 2035, using for example, an ACC coupled to a gateway to the communication network 2035. Other home appliances, such as the dishwasher 2040 and the oven 2045 are also be connected to the communication network 2035 and include the message authentication cryptographic hardware explained above.

In operation, the central facility 2010 preferably sends messages forming a reduced message set protocol (RMSP) over the communication network 2035 to the home appliances 2040, 2045, 2050. The reduced message set protocol (RMSP) is a relatively small library of messages that provide query, command, and information messages between the central facility 2010 and the home appliances. The home appliances such as the refrigerator 2050 then authenticate the message, if required, received from the central facility 2010. If the message received by the refrigerator 2050 from the central facility 2010 is authentic, the refrigerator 2050 may then act on a command included in the message. Furthermore, the refrigerator 2050 may transmit responsive messages back to the central facility 2010. The central facility 2010 may then authenticate the message from the refrigerator 2050, if required, and take an appropriate action.

In general, query messages do not require authentication by the home appliances 2040, 2045, 2050 that receive them. Examples of query messages include, "what is your counter setting?", "what is the next counter setting you expect the central facility 2010 to use?", "do you have a message to send?", "repeat the last message you sent", or "repeat the last message you accepted." Command messages, however, generally require authentication because they request the appliance to take a specific action. Examples of command messages include "perform the commanded action", for example "shut off", "turn on", "change your secret keying variable", or "raise/lower your temperature." Another example of a command message is "continue". The Continue message indicates that the central facility 2010 has received an authenticated message from the appliance, and that the appliance should now increment its counter.

The home appliances 2040, 2045, and 2050, may send query response messages or information messages. The query response messages preferably do not require authentication by the central facility 2010 that receives them. Examples of query response messages include "my counter setting is x", where x is the counter setting in the appliance, "the next counter setting I expect the central facility 2010 to use is y", "I have a message to send", "I do not have a message to send", or "the last message I sent was z". Information messages are preferably authenticated. Examples of information messages include "I am reporting the following information Q." Q may be diagnostic information requested by the central facility 2010 or a reportable condition detected by sensors communicating locally to the home appliance such as the refrigerator 2050, for example.

FIG. 21 illustrates a flow diagram 2100 of the authentication algorithm used to produce an authentication word, W. At step 2102, the CPU 2015 at a central facility 2010 receives an M-byte message, MSG, with bits MSG=($m_{8(M-1)+7}, \ldots, m_{8(M-1)}, \ldots, m_{15}, \ldots, m_8, m_7, \ldots, m_0$) that are grouped into M bytes ($MSG_{M-1}, \ldots, MSG_1, MSG_0$). At step 2150, the CPU 2015 also reads or obtains a 3-byte counter, C, with bits $C=(c_{23}, \ldots c_{16}, c_{15}, \ldots, c_8, c_7, \ldots, c_0)$ that are grouped into 3 bytes ($C_2, C_1, C_0$) from the counter 2025. The counter 2025 is initially set to all zeros. Additionally, at step 2120, the CPU reads or obtains an X-byte secret keying variable, K, with bits $K=(k_{8X-1}, \ldots, k_{8X-8}, \ldots, k_{15}, \ldots, k_8, k_7, \ldots, k_0)$, that are grouped into X bytes ($K_{X-1}, K_{X-2}, \ldots, K_2, K_1, K_0$). In the preferred embodiment, X=6.

The authentication word, W, is a function of the M-byte message, the 3-byte counter, and the X-byte secret keying variable. That is, $W=f(M,C,K)$. The complexity of the function, $f$, is generally appropriate for the class of CPUs that may be present in home appliances. Next, at step 2125, a 4-byte working register, R, is constructed with bits $R=(r_{31}, \ldots, r_{24}, r_{23}, \ldots, r_{16}, r_{15}, \ldots, r_8, r_7, \ldots, r_0)$ that are grouped into four bytes ($R_3, R_2, R_1, R_0$). Then, at step 2130, $R_3$ is initialized as a directional code. That is, $R_3=(r_{31}, \ldots, r_{24})$ where (0, ..., 0) represents a transmission from a remote terminal 2050 to a central facility 2010, and (1, ..., 1) represents a transmission from a central facility 2010 to a remote terminal 2050. At step 2135, R2, R1, and R0 are initialized as equal to the 3-byte counter C. That is, $(R_2, R_1, R_0) = (r_{23}, \ldots, r_{16}, r_{15}, \ldots, r_8, r_7, \ldots, r_0) = (c_{23}, \ldots c_{16}, c_{15}, \ldots, c_8, c_7, \ldots, c_0)$.

Next, at step 2140, an index is determined. The index is a variable calculated by index=max(3,M−1). That is, the greater of the two values 3 or M−1 is the value of the variable index. Next at step 2145, the simple Boolean dot product P of $R_2$ and $R_0$ (bit-by-bit Boolean AND) is formed as: $p_0=r_{16}r_0$, $p_1=r_{17}r_1$, $p_2=r_{18}r_2$, $p_3=r_{19}r_3$, $p_4=r_{20}r_4$, $p_5=r_{21}r_5$, $p_6=r_{22}r_6$, and $p_7=r_{23}r_7$ where $P=(p_7, p_6, p_5, p_4, p_3, p_2, p_1, p_0)$. Then at step 2150, Q is formed by Bit-by-bit exclusive-or $(p_7, p_6, p_5, p_4, p_3, p_2, p_1, p_0)$ with (0,1,0,1,0,1,0,1) to form $(q_7, q_6, q_5, q_4, q_3, q_2, q_1, q_0)$ where $Q=(q_7, q_6, q_5, q_4, q_3, q_2, q_1, q_0)$. Next, at step 2155, S is formed where $S=(s_7, s_6, s_5, s_4, s_3, s_2, s_1, s_0)$ by adding Q to K using binary addition. That is, the byte $(q_7, q_6, q_5, q_4, q_3, q_2, q_1, q_0)$ is added to the i-th key byte, $K_i$, i.e., $(k_{8i+7}, k_{8i+6}, k_{8i+5}, k_{8i+4}, k_{8i+3}, k_{8i+2}, k_{8i+1}, k_{8i})$ using binary addition. Then the left-most carry bit is discarded, followed by an end-around rotate of the byte S to form the new $S=(s_6, s_5, s_4, s_3, s_2, s_1, s_0, s_7)$. Then, at step 2160, bit-by-bit exclusive-or S with the byte $R_3$ to form byte T. Next, at step 2165, F is formed by bit-by-bit exclusive-or byte T with byte $MSG_{j\ modulo(index+1)}$. Next at step 2170, the following replacements occur: byte $R_3$ with byte $R_2$, byte $R_2$ with byte $R_1$, byte $R_1$ with byte $R_0$, and byte $R_0$ with byte F. Then at step 2175, steps 2145 through 2170 are repeated the number of times indicated by the index variable. Then at step 2180, steps 2140 through 2170 are repeated for the number of bytes in the secret key variable, K. Next, at step 2185, the CPU performs an end around shift of the R register by one bit, that is, it replaces $(r_{31}, r_{30}, \ldots, r_1, r_0)$ by $(r_{30}, r_{29}, \ldots, r_0, r_{31})$.

At step 2190, steps 2140 through 2185 are iterated, preferably between 4 and 128 times. After step 2190, the authentication word W is formed by setting W=R, that is, $w_{31}=r_{31}$, $w_{30}=r_{30}, \ldots, w_0=r_0$. Finally, at step 2195, the authentication word W is transmitted with the message. Note that the message itself is not scrambled or encrypted. Rather, the authentication word W is provided that allows a receiver to determine whether a message is genuine.

Because a secret keying variable may sometimes be compromised, the present authentication techniques provide a mechanism for generating one or more replacement secret keys using a single additional master keying variable. FIG. 22 illustrates a flow chart 2200 of an algorithm that allows the secret keying variable, K, to be changed in an appliance without having physical access to the appliance. To this end, a "master" secret keying variable, MK may be installed in the embedded cryptographic devices 2020, 2060. The secret keying variable K is changed to a new secret keying variable K' one byte at a time. First, at step 2210, the central facility 2010 sends a command message to the home appliance to change its keying variable K. Next, at step 2220, the authentication algorithm as described in FIG. 21 is run using the master keying variable MK instead of the original K. The original secret variable K is treated (processed) as an X-byte message. The result is a four-byte authentication word W. Next, at step 2230, the first byte of the authentication word, W, for example, bits $w_0, w_1, \ldots, w_7$ are selected as the first eight bits of the new secret keying variable, K'.

Subsequently, at step 2240, the algorithm is repeated again using the master keying variable MK and processing the message comprised of the concatenation of K and W to produce the authentication word W'. Then, at step 2250, the first byte of W' then constitutes the second byte of the new secret keying variable, K'. Next, at step 2260, the algorithm is repeated again using the master keying variable MK and processing the message consisting of the concatenation of K and W' to produce the authentication word W". Then at step 2270, the first byte of W" then constitutes the third byte of the new secret keying variable, K'. At step 2280, steps 2260–2270 are repeated until the new secret keying variable, K', has been completely generated. Finally, at step 2290, K is replaced with K'. The command to change the secret keying variable may also specify a change in the length of the secret keying variable.

FIG. 23 illustrates a flow chart of the authentication process 2300. First, at step 2310, a receiver (e.g., the refrigerator 2050), receives an authentication word W, and a message M, from the central facility 2010. Next, at step 2320, the refrigerator 2050 retrieves its counter value, C, and its keying variable K. Then at step 2330, the refrigerator 2050 generates a local authentication word W to compare with the authentication word sent from the central facility 2010. Next, at step 2340, the local authentication word is compared to the received authentication word. If the two authentication words match exactly, then at step 2350, the message M, from the central facility 2010 is accepted by the refrigerator 2050 and acted on. If the two authentication words do not match exactly, then at step 2360, the message M is rejected.

Generally, the counters referenced above are preferably non-resettable, non-volatile, and incremented after each message sent or received. In general, an ECD increments its counter when it receives an answer from the central facility 2010 in response to a message sent to the central facility 2010. The central facility 2010 may store counters and keying variable for numerous home appliances distributed across numerous buildings, campuses, geographic regions, and the like. Thus, a single central facility 2010 may provide message authentication for a large number of home appliances by accessing the particular counter and keying variable for each appliance as messages are sent to and received from that appliance. The central facility 2010 may check the connection between the central facility 2010 and a receiver using a command that requires no action, except authentication and counter incrementation. A connection check may occur at predetermined elapsed times without communication from the receiver (e.g., 8 hours, 1 day, and the like).

After sending a message requiring authentication to an ECD, the central facility 2010 may query the ECD for the next counter setting that the ECD expected the central facility 2010 to use. If the counter had not been incremented, then the central facility 2010 may ask for a copy of the last message that the ECD had accepted.

It is also noted that the algorithm as presented above is not restricted to the particular implementation set forth above. Thus, the secret keying variable length, counter length, number of iterations, and the like may be changed depending on the specific implementation desired and computational capacity available.

While the invention has been described with reference to a preferred embodiment, those skilled in the art will understand that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. Apparatus for controlling an appliance comprising:
    a source of command fields for the appliance, said command fields including context subfields defining operating modes and command subfields defining operations to be performed within the context subfields;
    a network arranged to transmit the command fields between the source and the appliance; and
    a controller arranged to process the command fields so that an operation defined by one of the command subfields is performed.

2. The apparatus of claim 1 wherein the operating modes comprise one or more of:
    a local maintenance mode arrange to maintain the appliance at the appliance location;
    a remote maintenance mode arranged to maintain the appliance with use of the network from a location remote from the appliance;
    a manufacturing mode arranged to facilitate manufacture of the appliance;
    a marketing mode arranged to demonstrate one or more features of the appliance;
    a local customer mode arranged to operate the appliance at the appliance location;
    a remote customer mode arranged to operate the appliance with use of the network from a location remote from the appliance;
    an appliance mode enabling one appliance to communicate with another appliance; and
    a security mode enabling secured communications with the appliance.

3. The apparatus of claim 2 wherein the security mode employs an authentication algorithm.

4. The apparatus of claim 3 wherein the source comprises a CPU and wherein at least a portion of the authentication algorithm is executed by the CPU.

5. The apparatus of claim 3 wherein at least a portion of the authentication algorithm is executed by the controller.

6. The apparatus of claim 3 wherein the authentication algorithm comprises a keying variable.

7. The apparatus of claim 6 wherein the keying variable is changed without access to the appliance.

8. The apparatus of claim 3 wherein the source comprises an embedded cryptographic device arranged to authenticate messages from the appliance.

9. The apparatus of claim 1 wherein a single frame of data comprises one of the context subfields and one of the command subfields.

10. The apparatus of claim 1 wherein the command fields further comprise data relating to the appliance.

11. The apparatus of claim 10, wherein the data comprise one or more of:
    an appliance model number;
    appliance setup conditions;
    an appliance date of last service;
    appliance diagnostic results;
    an appliance abuse condition;
    an appliance subsystem condition;
    an appliance line voltage history;
    appliance usage;
    appliance power outage information; and
    appliance wiring information.

12. The apparatus of claim 1 wherein the network comprises the internet.

13. The apparatus of claim 1 wherein the source of at least some of the command fields is located in the appliance.

14. The apparatus of claim 1 wherein the source of at last some of the command fields is located at a facility remote from the appliance accessible by the network.

15. The apparatus of claim 1 wherein the appliance comprises one of:
    a refrigerator;
    a dishwasher;
    a laundry washer;
    a laundry dryer;
    a microwave oven;
    an air conditioner;
    a range;
    a wall oven;
    a range counter unit;
    a water softener;
    a water filter; and
    a water heater.

16. The apparatus of claim 1 wherein controller attempts to process the context subfield and wherein the context subfield is changed in the event the controller fails to process the context subfield.

17. A method of controlling an appliance comprising:
    transmitting command fields for the appliance, said command fields including context subfields defining operating modes and command subfields defining operations to be performed within the context subfields; and
    processing the command fields so that an operation defined by one of the command subfields is performed.

18. The method of claim 17 wherein the operating modes comprise one or more of:
    a local maintenance mode arrange to maintain the appliance at the appliance location;
    a remote maintenance mode arranged to maintain the appliance with use of the network from a location remote from the appliance;
    a manufacturing mode arranged to facilitate manufacture of the appliance;
    a marketing mode arranged to demonstrate one or more features of the appliance;
    a local customer mode arranged to operate the appliance at the appliance location;

a remote customer mode arranged to operate the appliance with use of the network from a location remote from the appliance;

an appliance mode enabling one appliance to communicate with another appliance; and a security mode enabling secured communications with the appliance.

19. The method of claim 18 wherein the security mode employs an authentication algorithm.

20. The method of claim 19 further comprising executing at least a portion of the authentication algorithm at a location remote from the appliance.

21. The method of claim 19 further comprising executing at least a portion of the authentication algorithm in the appliance.

22. The method of claim 19 wherein the authentication algorithm comprises a keying variable.

23. The method of claim 22 further comprising changing the keying variable without access to the appliance.

24. The method of claim 19 further comprising authenticating messages from the appliance at the remote location.

25. The method of claim 17 wherein said transmitting comprises transmitting one of the context subfields and one of the command subfields in a single frame of data.

26. The method of claim 17 wherein the command fields further comprise data relating to the appliance.

27. The method of claim 26, wherein the data comprise one or more of:

an appliance model number;

appliance setup conditions;

an appliance date of last service;

appliance diagnostic results;

an appliance abuse condition;

an appliance subsystem condition;

an appliance line voltage history;

appliance usage;

appliance power outage information; and appliance wiring information.

28. The method of claim 17 wherein said transmitting comprises transmitting via the internet.

29. The method of claim 17 further comprising storing the command fields in the appliance.

30. The method of claim 17 further comprising storing the command fields at a facility remote from the appliance.

31. The method of claim 17 wherein the appliance comprises one of:

a refrigerator;

a dishwasher;

a laundry washer;

a laundry dryer;

a microwave oven;

an air conditioner;

a range;

a wall oven;

a range counter unit;

a water softener;

a water filter; and a water heater.

32. The method of claim 17 further comprising changing the context subfield in the event said processing fails.

* * * * *